(12) United States Patent
Kidd

(10) Patent No.: US 12,130,895 B2
(45) Date of Patent: *Oct. 29, 2024

(54) ACCESS CONTROLS USING TRUST RELATIONSHIPS AND SIMPLIFIED CONTENT CURATION

(71) Applicant: Kiddofy, LLC, Bellevue, WA (US)

(72) Inventor: Eric D. Kidd, Bellevue, WA (US)

(73) Assignee: Kiddofy, LLC, Bellevue, WA (US)

( * ) Notice: Subject to any disclaimer, the term of this patent is extended or adjusted under 35 U.S.C. 154(b) by 521 days.

This patent is subject to a terminal disclaimer.

(21) Appl. No.: 17/185,055

(22) Filed: Feb. 25, 2021

(65) Prior Publication Data

US 2021/0279304 A1    Sep. 9, 2021

Related U.S. Application Data

(63) Continuation of application No. 16/371,117, filed on Apr. 1, 2019, now Pat. No. 10,942,991.

(60) Provisional application No. 62/688,516, filed on Jun. 22, 2018.

(51) Int. Cl.
| | | |
|---|---|---|
| *G06F 21/12* | (2013.01) | |
| *G06F 3/0482* | (2013.01) | |
| *G06F 3/0483* | (2013.01) | |
| *G06F 16/954* | (2019.01) | |
| *G06F 16/957* | (2019.01) | |

(52) U.S. Cl.
CPC .......... *G06F 21/128* (2013.01); *G06F 3/0482* (2013.01); *G06F 3/0483* (2013.01); *G06F 16/954* (2019.01); *G06F 16/9574* (2019.01); *G06F 2221/2117* (2013.01)

(58) Field of Classification Search
CPC .. G06F 21/128; G06F 16/954; G06F 16/9574; G06F 3/0482; G06F 3/0483; G06F 2221/2117
USPC .......................................................... 726/2
See application file for complete search history.

(56) References Cited

U.S. PATENT DOCUMENTS

| | | | |
|---|---|---|---|
| 7,793,334 B2 | 9/2010 | Lewis | |
| 8,205,240 B2 | 6/2012 | Ansari et al. | |
| 8,544,061 B2 | 9/2013 | Chen | |
| 8,645,422 B2 | 2/2014 | Pool | |
| 8,839,456 B2* | 9/2014 | Ting | G06F 21/32 726/28 |
| 8,843,953 B1* | 9/2014 | Dang | H04N 21/4542 725/28 |
| 9,363,283 B1 | 6/2016 | Herrera-Yague et al. | |
| 9,600,687 B2* | 3/2017 | Allen | G06Q 30/0207 |

(Continued)

OTHER PUBLICATIONS

Garge et al., 2016 IEEE, "Comparative Analysis of Trust Establishment Through Semantic and Non Semantic Models", pp. 504-508 (Year: 2016).*

(Continued)

*Primary Examiner* — Khalil Naghdali
(74) *Attorney, Agent, or Firm* — Davis Wright Tremaine LLP

(57) ABSTRACT

Parental control of child's web-based digital content experience, which can be applied to other contexts such as education, the workplace or other organizations. Trust relationships authorize specified users or organizations to permit access to content or resources by other users. Collection curation including content reputation and age appropriate ratings disclosed.

20 Claims, 14 Drawing Sheets

(56) References Cited

U.S. PATENT DOCUMENTS

| | | |
|---|---|---|
| 11,902,227 B2* | 2/2024 | Ciancio-Bunch .... G06Q 10/107 |
| 2008/0033740 A1 | 2/2008 | Cahn et al. |
| 2012/0192249 A1 | 7/2012 | Raleigh |
| 2014/0019443 A1 | 1/2014 | Golshan |
| 2015/0058931 A1 | 2/2015 | Miu et al. |
| 2017/0041296 A1 | 2/2017 | Ford et al. |
| 2017/0301042 A1 | 10/2017 | Ryan et al. |

OTHER PUBLICATIONS

Melenhorst et al., 2007 IEEE International Professional Communication Conference, "Usefulness of Tags in Providing Access to Large Information Systems", pp. 1-9 (Year: 2007).*

Alshabib et al., "Deriving Ratings Through Social Network Structures," Proceedings of the First International Conference on Availability, Reliability and Security, Apr. 20, 2006, 8 pages.

Garg et al., "Comparative analysis of trust establishment through semantic and non semantic models," 3rd International Conference on Computing for Sustainable Global Development, Mar. 16, 2016, 5 pages.

* cited by examiner

ACCESS CONTROLS USING TRUST RELATIONSHIPS AND SIMPLIFIED CONTENT CURATION

CROSS-REFERENCE TO RELATED APPLICATIONS

This application is a continuation of U.S. patent application Ser. No. 16/371,117, filed Apr. 1, 2019, entitled "ACCESS CONTROLS USING TRUST RELATIONSHIPS AND SIMPLIFIED CONTENT CURATION," which claims the benefit of U.S. Provisional Patent Application No. 62/688,516, filed Jun. 22, 2018, the disclosures of which are incorporated herein by reference in their entirety.

TECHNICAL FIELD

Embodiments pertain to novel improvements in parental control of their children's web browsing experience, which may be applied to other contexts such as the workplace or other organizations. Content curation advancements are also disclosed.

BACKGROUND

Existing technology used by parents to regulate their children's access to content (e.g., websites, apps, etc.) commonly uses a list of approved content and a list of blocked content (i.e., access control list or "ACL"). These lists are populated by parents and sometimes by the provider of the parental control software being used. In some cases, with cumbersome research, such ACLs can be found on the Internet, downloaded, and manually applied to the parental control software being used. The parental control software then limits access for the child to content based on the information in these lists.

As noted above, this approach creates a need for a better solution for many reasons, including but not limited to:
1. Parents are left alone to discover content that is both interesting to their child and age-appropriate.
2. Parents are left alone with the burden of populating and maintaining the ACLs, maybe with periodic updates from the provider of the parental control software being used.
3. Content ACLs available from providers might not closely align with a parent's preferences for their child, since they're designed by people with other judgement and for a broader audience.
4. As the content ACLs are populated, only the content's identifier (e.g., a URL for web page) and the parent's decision to allow or block is captured—no other information about the content is associated or retained—providing little information to users about the content.
5. No automated/algorithmic analysis of content assets is done to produce, at large scale, additional information that aids parents in determining content appropriateness, such as popularity by age and/or gender groups, content relevance (e.g. is the content still current), and topics of interest.
6. There's no easy way to share one's content access control decisions, so users (e.g. family, friends, and users at large globally) do not benefit from the work invested by others.
7. There's no central place where individuals and organizations congregate as a community to improve content and access controls for the benefit of children.
8. There's no easy way for people, including children, to share content with other children.

Existing solutions make content discovery and approval tedious, ongoing tasks and depend on parents to be both technically savvy and well-informed about the ever-changing universe of available content. As such, children typically end-up either over-restricted (i.e., the child lacks access to great content because their parents either haven't discovered the content or taken the time to update the ACLs) or under-restricted (i.e., the child has access to potentially inappropriate content). In both cases, it is hard for a child to discover interesting, age-appropriate content without access to search engines such as Google, which risks undue exposure even when using search services that claim to be kid-safe.

FIG. 1 illustrates a prior art approach of ACL based software 110 for a parent 100 to control access to content (not shown) for a child 190. More particularly, the parent 100 begins by installing the software 110, as illustrated by the arrow pointing from the parent 100 to the software 110. When the child 190 attempts to receive content (e.g. web page, media content, etc.) then the child's 190 request (designated by the arrow from the child 190 to the software 110) for such content passes through the software 110 first, which in turn categorizes the content as: approved content by ACL 120, blocked content by ACL 130 or content not recognized by ACL 125.

Typically, if the content falls into the category of approved content 120, then the content is provided to the child 190, as illustrated by the arrow from the approved content 120 to the child 190. However, if the content is not categorized by the software 110 as approved content 120, nor recognized as blocked content 130 (resulting in denied access), then access is denied rendering it as content not recognized 125—and therefore not provided to the child 100 (illustrated by no arrow existing from the content not recognized 125 and the child 190). This setting is safe in that only explicitly approved content 120 can reach the child 190, but may also be over restrictive and prevent the child 190 from viewing content which may be perfectly acceptable yet not included on the approved content 120 ACL.

What is needed in the present environment is a different approach for parents to manage access to content for their children. The approach should be significantly more efficient and reliable, including the benefit for parents to utilize the work and time investment of other parents and organizations.

SUMMARY

Embodiments may harness the judgement of small and large communities of individuals and organizations to benefit the wellbeing of children. Embodiments may enable children to safely enjoy a larger set of personally appropriate and relevant digital content, while preventing them access to inappropriate content.

Utilizing embodiments, children may have access only to content approved by their parent directly or entities trusted by their parent. Trusted entities may include selected individuals, organizations, and collections of content curated by others. As a safeguard, parents may also specify sets of prohibited content-maintained themselves and/or by others. Embodiments may enable parents to easily create and end trust relationships and moderate content approved by trusted entities.

Content may be approved when a trusted individual or organization shares it directly with the child or when it is added to a collection that has been trusted for the child. Embodiments may make it easy for users to quickly curate (e.g. classify) and share content, requiring them to provide information, including the content's age appropriateness and description, used by the Service safeguards, to aid content discovery, and to inform parents.

One of the aspects of an embodiment is its enablement of child-to-child trust relationships, while ensuring only appropriate content is shared between children. These relationships allow a fun way for children to interact safely with their friends and expand their selection of interesting content.

Various embodiments of the present disclosure represent a significant advancement in controls for access to content, as well as curation of collections of content identifiers. The various methods described can also be implemented in a medium, memory or apparatus form.

BRIEF DESCRIPTION OF THE DRAWINGS

Embodiments are illustrated by way of example, and not by way of limitation, in the figures of the accompanying drawings and in which like reference numerals refer to similar elements.

FIG. 6 is a flowchart of an embodiment of user sign-in.

DETAILED DESCRIPTION OF PREFERRED EMBODIMENTS

Figure 1:
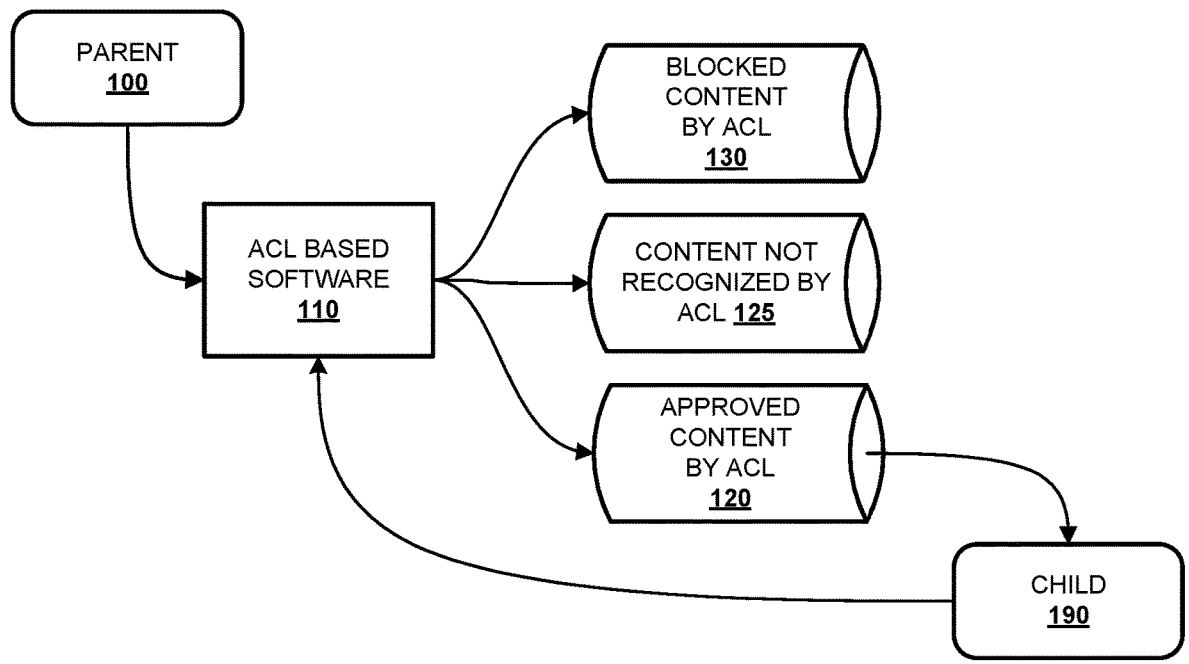
FIG. 1 is prior art approach to controlling access to content.

In the following description, for the purposes of explanation, specific details are set forth in order to provide a thorough understanding. However, it will be apparent that embodiments can be practiced without these specific details. In other instances, well-known structures and devices are depicted in block diagram form in order to avoid unnecessary detail relating to the corresponding discussion; and similarly, steps in the disclosed method are depicted in flow diagram form. Section titles and references appearing within the following paragraphs are intended for the convenience of the reader and should not be interpreted to restrict the scope of the information presented at any given location.

The unique experiences and enhancements described herein comprise a plurality of advancements within various scopes in the business and technological arts. As such, each of the respective groupings of advancements and enhancements are described in more detail hereinafter in sections, which shall not be considered limiting in nature.

Introduction

Embodiments may enable not only a child's parent to easily and efficiently approve access to content, but also other people (e.g. individuals personally known by the parent and others), as well as organizations trusted by that parent. Embodiments may make managing trust relationships between the child and others, and moderating a child's approved content catalog, simple and easy for the parent. Since embodiments ensure children may access only content approved by parents and trusted entities, children enjoy a larger collection of appropriate content safely. Further, protections disclosed herein in embodiments may give parents confidence they may allow their children to share content with other children safely, bringing additional fun and relevant content to kids.

For purposes of this disclosure, several terms should be addressed as they are not limited by their normal definitions. With the purpose of disclosing and teaching embodiments, the following terms may have additional definitions, purposes or aspects, without limitation.

Service—When capitalized, this may refer to an embodiment wherein a service may be provided to customers or users in a manner that more closely resembles a service rather than a product; however, Service is not limited to only commercial applications (e.g. it can also refer to non-commercial applications). This term is not to be confused with the lowercase "service" used herein which is a common software term.

User—An individual of any age or an organization (e.g., company, school, church, government agency, non-profit, etc.) utilizing the Service. This should not be confused with User Objects, managed by the Database, or the common term "user" which is a common software term (e.g. user interface).

Second Parent—An adult User designated by a parent (e.g. spouse, co-parent) to have parental authority for the granting parent's children.

Community—A plurality of Users, which may be all the Users, or a subset thereof.

Entity—Typically refers to the logical representation of a unique User. When referring to a trust relationship, it may refer to either a User or a Collection.

Collection—A set of either Approved Content or Blocked Content curated for use by Users. Users may share Collections with other Users or openly with a Community. A User with authorized/approved access to a Collection may also be known as a subscriber to that Collection. A Collection is considered an Entity, and as such, Users may trust a Collection and create a trust relationship with that Collection, such that the Collection may provide access to content for another User.

Feed—Collections may additionally take the form of a Feed. A Feed may be a Collection with new content added periodically. When a new content item may be added to a Feed, the Service may notify its subscribers. Since content in Feeds may be meant to be fresh, it typically may expire (automatically removed from the Collection) after a predetermined amount of time.

Personal Collection—Default Collections created to organize content shared with a User by other trusted Users. Another type of Personal Collection may be a User's Favorites. This may be any of the User's Approved Content they may have designated to be a favorite and may be organized in their Favorites Collection for easy browsing.

Content—Includes but is not limited to any form of content traditionally considered content in the context of a computer or the Internet (e.g. web page content, computer files, audio file or video file or other media file whether streamed or downloaded, etc.). An example may be a video helping a student with $4^{th}$ grade math, posted on YouTube. Without limitation, the video file itself, as well as the YouTube website page, would both be considered content.

Approved Content—A set of content authorized/approved for use by a User (e.g. a child).

Blocked Content—A set of content restricted/blocked from use by a User (e.g. a child).

Content Identifier—Includes but is not limited to any address, URL, shortcut, network link or other identifier that may be used to retrieve content. In the example provided in the paragraph above, without limitation, the content identifier could be considered the Internet URL for the You Tube page with the video presented. As such, the term Internet address, URL and content identifier may be used interchangeably within the scope of this disclosure, without limitation.

Trust Relationships and Content Sharing

Embodiments may implement trust relationships and content sharing. Trust relationships and content sharing may expand both the set of Allowed Content and inappropriate Blocked Content, for a child because they may enable the judgement of other Users (including organizations), Collections and the Community to benefit the child. Thus, a trust relationship established by a parent may be a method to authorize a child to access content that may have been approved by other Users, may have been shared in Collections or may have been shown by the Community to be safe.

Content sharing may be typically permitted via one-way and mutual trust relationships, controlled by parents for their children. A User may be authorized and may receive shared content directly from other trusted Users or by accessing trusted content Collections, which may be curated by Users, organizations or the Service (e.g. a commercial embodiment hosting a service that provides the features disclosed herein).

A Collection may be a set of content usually (but not necessarily) having something in common, such as topic of interest and age-appropriateness (e.g., web pages about cooking for kids under 10). Such a Collection may have been collected and may be maintained by a User for purposes of organizing content for themselves (like web browser bookmarks) or sharing with other Users. For example, the U.S. National Parks (or any User) might create a Collection of web pages from their web sites (e.g., http://www.nps.gov) that offer information and photos of National Parks throughout the country and make that Collection available to the Community.

A special type of Collection may be known as a Feed, which may be a series of curated content assets/items intended for sharing with Users. Content shared via a Feed may often be (but not necessarily) relevant to the current time (e.g., news articles or current events, such as movie reviews and local concert schedules) and may automatically expire (be deleted) from the Feed after a specified date.

In embodiments, content sharing rules may differ depending on the type of Entity (User or Collection) that may be trusted and whether the Users involved are children or adults. These rules may be illustrated by the following examples.

When a User ("Mary") trusts another User ("Joe") or a Collection ("Joe's Collection"), Joe may share content directly with Mary. If Mary and Joe are both adults, there are no sharing restrictions. Though, consider the case where Mary is a child . . . . For example, Joe (an adult) finds a web page on the Internet that will interest Mary (a child) and he believes is appropriate for her to view. He then may curate (e.g. characterize or assign characteristics to the content) and may share that page with Mary. As an adult, trusted by Mary's parent, Joe may use his own judgement to determine what is appropriate for Mary, including content designated to have a minimum age-appropriateness older than Mary. However, if Joe is a child, an embodiment may allow him to share only content he may have received from Entities trusted for Joe by his parent and that has been designated to be appropriate for Mary's age. In this case, by trusting Joe (a child) or Joe's Collection (a collection by a child) for Mary (a child), Mary's parent may be essentially trusting Joe's parent to make good decisions for Joe. If Joe's trusted adults (or parent) have approved for him content that's more mature, Mary may still be safe because only her trusted adults can share content with her that is more mature than her age.

Besides authorizing and sharing content directly with Mary, Joe may also authorize and share Collections/Feeds he may curate himself. For example, he might have created a Collection of content about science fiction movies. He may optionally grant Mary permission to view the content in that Collection. In this case, an embodiment may authorize and permit Mary access to content in the Collection that has been designated appropriate for her age. This rule-preferably but not necessarily a core part of the design—may be valuable in the case that Joe is older than Mary and could have content approved for him that may be too mature for Mary.

Similarly, Users (individuals and organizations) may authorize and publish their curated Collections so that any User may trust (also known as, subscribe to) them. This is different than above because the trusted Entity may be the individual Collection, not the User who may be its curator. For example, if Mary's parent trusts for her a popular Collection of $4^{th}$ Grade math content, curated in the Service by a math tutor they don't know (or a local school, for example), Mary is authorized and able to access age-appropriate content in that Collection, but the tutor cannot share content with Mary in any other way.

Figure 2:
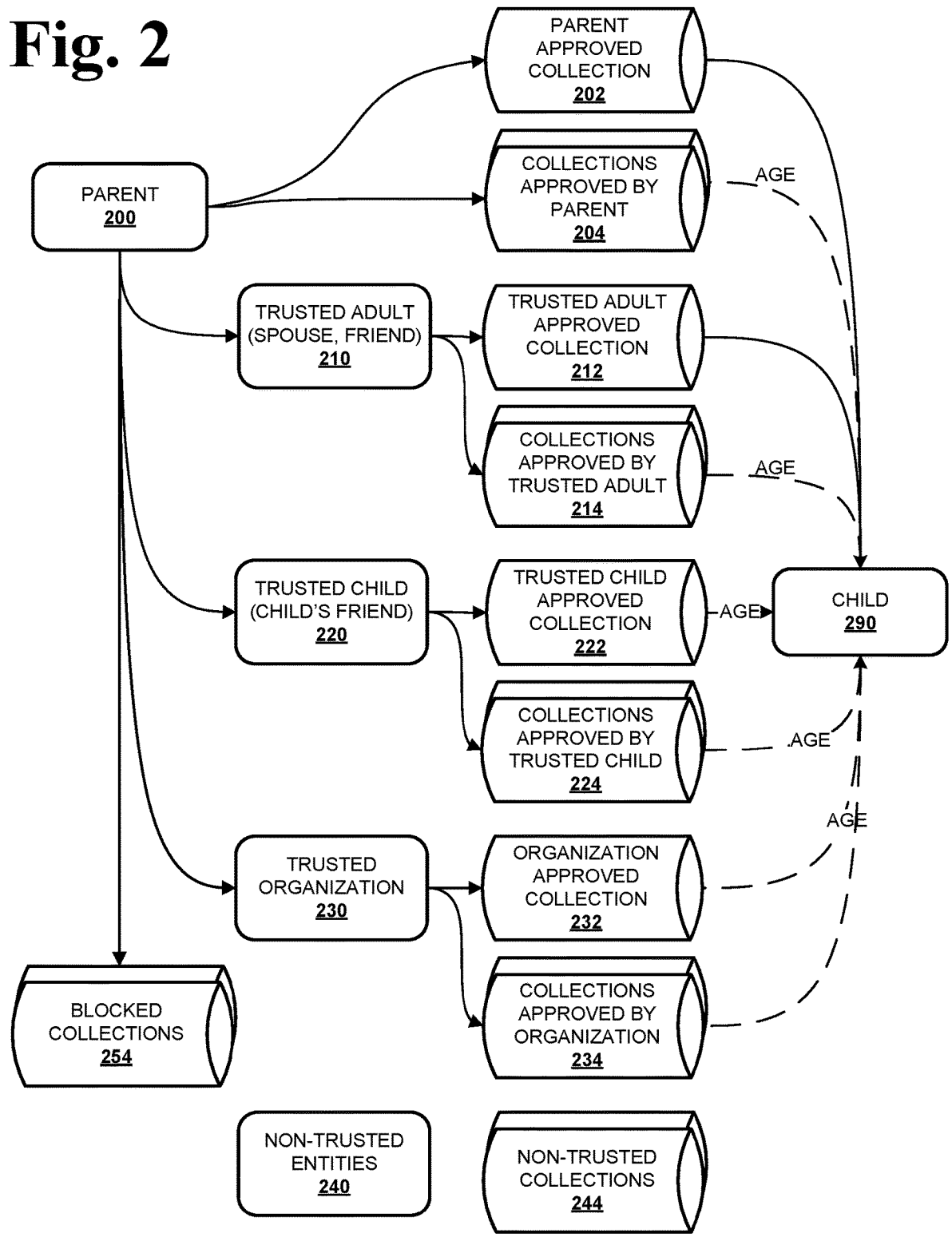
FIG. 2 is a logical diagram illustrating an embodiment of trust relationships.

FIG. 2 is a logical diagram illustrating an embodiment utilizing trust relationships to enable a parent 200 (e.g. Mary's parent in the example above) to control access of content to a child 290 (e.g. Mary). Access to content for the child 290, as described above, may come in a number of different forms or sources and is authorized by the parent 200 in a number of ways: curated Collections created by the parent 200 (e.g. web content selected by Mary's parent for Mary), Collections (e.g. $4^{th}$ Grade math content) trusted by the parent 200, or trust relationships (e.g. Joe).

With regard to curated Collections, a parent approved collection 202 as illustrated represents a Collection created by the parent 200, such as one or more websites that the parent 200 may consider acceptable for the child 290 to receive. The arrow from parent 200 to parent approved collection 202 represents the step of creating the parent approved collection 202. The arrow from the parent approved collection 202 to the child 290 represents that the child 290 is authorized and has access to retrieve the content which has been approved in the parent approved collection 202.

It is noted that content itself (e.g. web page content, audio file, video files, etc.) is preferably not typically stored in a Collection (e.g. the parent approved collection 202), but rather the parent approved collection 202 is a data structure with the ability to store and administrate the content identifier that enables the child 290 to retrieve the content from that Internet location. By way of example, the parent approved collection 202 may store a content identifier such as "www.FourthGradeHistory.com/home.htm" but preferably would not store the content itself (e.g. the page, images on the page, etc.), which would be retrieved from the website hosted at that content identifier.

In addition, the parent 200 may trust an already established Collection (e.g. $4^{th}$ Grade math content) or multiple Collections in the Service, illustrated by collections approved by parent 204 as illustrated in the figure. Such already established Collections may be curated by the Service, by organizations, or by other Users. Similarly, the arrow extending from the parent 200 to the collections approved by parent 204 illustrates that the parent 200 trusts the collections approved by parent 204 for the child 290.

The dashed arrow extending from the collections approved by parent 204 to the child 290 illustrates content authorized and allowed for the child 290 originating from the collections approved by parent 204. However, it is noted that the arrows are dashed rather than solid in the illustration, together with the word "AGE", noting that when the parent 200 trusts the collections approved by parent 204, an age condition is typically configured that may be met before the child 290 can access content originating from a Collection other than the parent's personally curated Collection (e.g. parent approved collection 202). Thus, in order for child 290 to be authorized and access the content the child 290 must be at least as old as the age rating of the content originating from the collections approved by parent 204.

Content can also be authorized for the child 290 by the parent 200 through trust relationships, namely those relationships established by the parent 200 with trusted adult 210 (e.g. a spouse or adult friend of the parent, or a parent of a child friend of child 290, etc.), trusted child 220 (e.g. a child friend of the child 290) and trusted organization 230 (e.g. National Parks). It is noted that the parent 200 may also designate a trusted adult 210 as a Second Parent of a child 290, thereby sharing the parent 200 administrative permissions with the trusted adult 210.

As noted earlier, the parent 200 may be able to trust any Entity, such as an adult, child, organization or any other Entity in the Community or Service. Although only one of each of these entities is illustrated for brevity purposes, the parent 200 may trust a plurality of each type of Entity without limitation. In FIG. 2, the trust relationship between the parent 200 and trusted adult 210, trusted child 220 and trusted organization 230 is represented by the arrows extending from the parent 200 to each of these entities, respectively.

Similar to how the parent 200 may create its own parent approved collection 202 and trust collections approved by parent 204, the trusted adult 210 may likewise have a trusted adult approved collection 212 and collections approved by trusted adult 214, respectively. The arrows extending from trusted adult 210 to the trusted adult approved collection 212 and the collections approved by trusted adult 214 illustrate that the trusted adult 210 has created or trusted said Collections, respectively. By virtue of the fact that the parent 200 trusts the trusted adult 210, the parent 200 is indirectly providing content from the trusted adult approved collection 212 and the collections approved by trusted adult 214 to the child 290, which is illustrated by the dashed arrows from the trusted adult approved collection 212 and the collections approved by trusted adult 214 extending to the child 290.

The dashed arrow extending from the collections approved by trusted adult 210 to the child 290 illustrates content authorized and allowed for the child 290 originating from the collections approved by trusted adult 214. However, it is noted that the arrows are dashed rather than solid in the illustration, together with the word "AGE", noting that when the parent 200 trusts the collections approved by trusted adult 210, an age condition is typically configured that may be met before the child 290 can access content originating from a Collection other than the trusted adult's personally curated Collection (e.g. trusted adult approved collection 212). Thus, in order for child 290 to be authorized and access the content the child 290 must be at least as old as the age rating of the content originating from the collections approved by trusted adult 214.

Again, similar to how the parent 200 may create its own parent approved collection 202 and trust collections approved by parent 204, the trusted child 220 may likewise have a trusted child approved collection 222 and collections approved by trusted child 224, respectively. The arrows extending from trusted child 220 to the trusted child approved collection 222 and the collections approved by trusted child 224 illustrate that the trusted child 220 has created or trusted said Collections, respectively. By virtue of the fact that the parent 200 trusts the trusted child 220, the parent 200 is indirectly providing content from the trusted child approved collection 222 and the collections approved by trusted child 224 to the child 290, which is illustrated by the dashed arrows from the trusted child approved collection 222 and the collections approved by trusted adult 224 extending to the child 290. However, it is noted that the arrows are dashed rather than solid in the illustration, together with the word "AGE", noting that when the parent 200 trusts the trusted child 220, an age condition is typically configured that may be met before the child 290 can access content originating from another child (in this case the trusted child 220). In order for child 290 to be authorized and access the content the child 290 but be at least as old as the age rating of the content originating from either the trusted child approved collection 222 or the collections approved by trusted child 224.

Once again, similar to how the parent 200 may create its own parent approved collection 202 and trust collections approved by parent 204, the trusted organization 230 may likewise have a organization approved collection 232 and collections approved by organization 234, respectively. The arrows extending from trusted organization 230 to the organization approved collection 232 and the collections approved by organization 234 illustrate that the trusted organization 230 has created or trusted said collections, respectively. By virtue of the fact that the parent 200 trusts the trusted organization 230, the parent 200 is indirectly authorizing and providing content from the organization approved collection 232 and the collections approved by organization 234 to the child 290, which is illustrated by the dashed arrows from the organization approved collection 232 and the collections approved by organization 234 extending to the child 290. However, for purposes of illustration herein, it is noted that the arrows are dashed rather than solid in the illustration, together with the word "AGE", noting that when the parent 200 trusts the trusted organization 230, an age condition can be configured (or not) that may be met before the child 290 can access content originating from an organization (in this case the trusted organization 230). In order for child 290 to be authorized and access the content the child 290 but be at least as old as the age rating of the content originating from either the organization approved collection 232 or the collections approved by organization 234. In the case of a trusted organization 230, however, it can also be alternatively configured in the Service that no such age condition is present for the child 290 to view content from a trusted organization 230.

Of course, in addition to allowing content for the child 290, the parent 200 may also choose to block certain content from the child 290, as illustrated by blocked collections 254. The arrow extending from the parent 200 to the blocked collections 254 represents that the parent 200 has opted to subscribe the child 290 to the blocked collections 254 and thus the child 290 would be prevented from access to the content in the blocked collections 254. The lack of access, or blocked access, is represented by an absence of a line connecting the child 290 to the blocked collections 254. As such, in addition to subscribing to Service offered blocked collections 254 or other blocked collections 254, the parent 200 may block access to specific content that the parent 200 has identified by curating a parent blocked Collection (also illustrated as one of the blocked collections 254).

Typically, in a Service offering, entities that are not trusted or blocked as illustrated on the figure as non-trusted entities 240, and Collections that are not trusted or blocked as illustrated on the figure as non-trusted collections 244, would not be accessible to the child 290. It is noted that no arrows are connected to either the non-trusted entities 240 nor non-trusted collections 244, representing that they have no contact with the parent 200, nor does the child 290 have authority or have access to the content represented by the non-trusted entities or non-trusted collections 244. Of course, in other embodiments or applications, access to the content in the non-trusted entities 240 or non-trusted collections 244 may be made available to the child 290, or other alternate approaches to handle such circumstances may be configured in the Service.

It is also noted, that throughout the disclosure, references to a "parent" are not restricted solely to that of the normal definition of a parent, but rather any individual, school, teacher, organization or Entity managing access over the child. Likewise, the "child" does not need to be a child of the parent in order to be consistent with the spirit of embodiments herein, as the child may be a child, student, employee or any Entity where the access to content is managed by the Entity representing the parent.

Functional Overview

Figure 3:
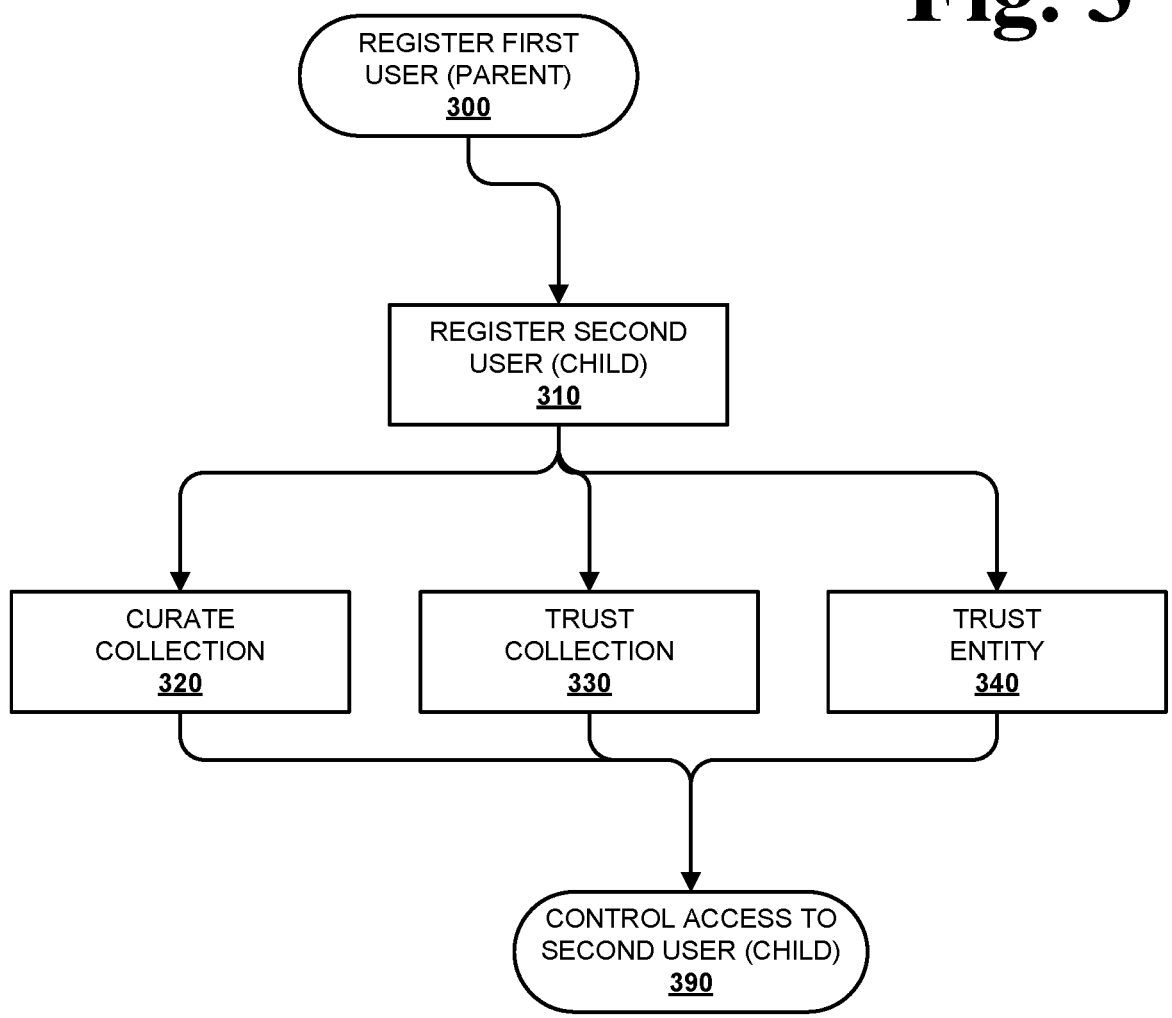
FIG. 3 is a top-level flowchart illustrating an embodiment of controlling access of content.

FIG. 3 is a top-level flowchart illustrating a basic method of controlling access to content between a first User and a second User, such as a parent and a child, respectively, (or as noted above, an employer and employee, etc.).

In step 300 a first User (e.g. parent) is registered in the Service. The step of registering, not unlike other administrative or functional tasks, may be accomplished through a typical personal computer, tablet, mobile device, smartphone, personal assistant device or other connected computing device. The purpose of such a registration is to establish the first User in the Service so that the first User may be capable of managing a second User in the Service.

In step 310 the second User (e.g. a child) is registered in the Service. For purposes of illustration, the second User is a child and registered by the first User. As noted in the previous examples, the first User has authority and manages the access of content for the second User. Following registration of both the first User and second User in steps 300 and 310, respectively, the first User may begin to setup the controlled access of content for the second User in the steps of curating a collection 320, trusting a collection 330, or trusting another Entity 340 (e.g. User, Organization, etc.) with respect to providing access to content for the second User. It is noted that the first User is not required to perform all of these steps but that these steps individually or in combination create options to afford access to content for the second User.

In step 320, the first User may curate a Collection of content that can be selectively allowed or blocked with respect to access for the second User. The curation process is described in greater detail in the sections that follow, but ultimately results in a Collection that may contain one or more content identifiers to content.

The first User may opt to trust one or more Collections already in existence as illustrated by step 330. In trusting a collection 330 the first User is allowing the second User access to content within the trusted Collection. Alternatively, the first User may also enable or subscribe blocked Collections (which for purposes of this step shall be considered the negative equivalent of "trusting" a Collection) wherein content within those blocked Collections is prevented from being provided to the second User. Thus, by trusting/subscribing to an approved content Collection or a blocked content Collection already in existence, the first User may put in place allowances or restrictions upon the content that the second User may access, respectively.

In step 340, as detailed above in the discussion of FIG. 2, the first User (e.g. parent) may choose to trust the judgment of another Entity (e.g. any User, Organization, Collection, etc.) with respect to providing access to content for the second User (e.g. child). The first User, in the case of a parent, may trust a number of different Entities ranging from a spouse, to other adult or non-adult relatives, friends of the child, parents of the child's friends, teachers, organizations, or any other reputable User that may be trusted to exercise their judgment and provide access to content for the second User (e.g. child).

Once the first User and second User have been registered, and the first User has thereafter (or in conjunction) either curated a Collection in step 320, trusted a Collection in step 330 or trusted an Entity in step 340, then a method of controlling access to content has been completed in step 390. Provided that age appropriate rating conditions have been met, if configured, then the second User may be authorized and may have access to the content. Of course, steps in this process may be selectively or iteratively repeated as needed or desired, or in different order than presented, without departing from embodiments.

Content Curation

When content worthy of being shared with another User is discovered on the Internet by an adult User (because children using an embodiment may not have direct/unrestricted Internet access), the adult User may introduce the content to another User by sharing it directly with the other User or adding it to one or more of their Collections. In that moment, the adult Users may complete curation of the content by answering a few simple questions. This process preferably may take less than 10 seconds to complete and sometimes as much as 20-30 seconds.

For example, in embodiments, to curate content the User begins by selecting the youngest age appropriate for viewing this content, from a list preferably presented to the User (e.g., "4 and younger", "5 to 7", "8 to 9", "10 to 12", etc.). This is a step in content curation that may ensure children may have access only to age-appropriate content. This step may provide a preliminary indication of the likely age range of viewer interest, with further indication determined by the Service Analytics (described herein).

Additional content authorizations or restrictions can be assigned at this point, including an expiration date for approval or blocking of the content. Similarly, the scope of access or blocking can be specified such as the whole domain, the web page only, or all access/blocking of the URL stem.

The User then preferably may select topics that apply to the content, from a list provided by the Service. This list may be first presented in a simple way, which enables quick, broad categorization of the content by topic (e.g., science, technology, nature, sports, cooking, movies, etc.). Optionally, embodiments may enable the User to categorize more deeply by dynamically expanding the list according to a taxonomy designed and maintained, such as: Science→Astronomy→Earth→Moon.

At this stage in the User experience, any number of questions may be presented to the User, which may be configured dynamically to maintain relevance and improve over time, which may serve to describe the content more fully. Additional examples may include a written description of the content, related keywords to aid search discovery, and the user's content quality ratings.

To keep curation quick and simple, this approach may enable Users to effectively curate content with minimal time and effort. Optionally, Users may put more thought and effort into their curation, benefitting other Users with richer content descriptions. To encourage accurate curation and inform parents when they consider trust relationships for their children, Analytics may be implemented to utilize multiple sources of data, including feedback from other Users, to determine a Curation Reputation for each User. A User's reputation score is an indicator to others of their success in accurately curating content.

Analytics & Content Reputation

Embodiments may use proprietary processes to produce intelligence from the analysis of multiple sources of data, including User profile information provided by adults, (e.g. age, gender, geographic location, interests, etc.), direct input/feedback from Users, observed User activity, inspection of content, curated content metadata, and other data sources. Intelligence derived from the data sources by the Service processes may be used to enhance the user experience. In addition to the Curation Reputation described in the previous section, the Service may use these techniques in the following areas.

Embodiments may use content information collected by its operator, combined with aggregated data submitted by Users (e.g. content ratings), for automatic analysis by the Service that may provide Users an easy means for evaluating content appropriateness. Known as Content Reputation, adults and children may be presented a summary of the content, automatically analyzed and prepared by the Service, that suggests age-appropriateness, topics of interest, geographic relevance (if applicable), and current popularity with groups of like-Users. In preferred embodiments, children's popularity ratings may be kept separate from parents' popularity ratings. For example, if a child requests access to a web page, in addition to previewing the page themselves, embodiments may aid parents in making a quick approval decision by providing the web page's Reputation. If the parents see that the page is popular with many parents having children of the same age (including from their same geographic location), then the parents might be more confident in approving the content for their child. Alternatively, the parents may be capable of allowing the Community (via the Content Reputation of the content), to serve as a basis to allow access to the content for the child. On the contrary, a Reputation indicating the content is for more mature audiences suggests the parent should preview the content carefully before approving.

Figure 4:
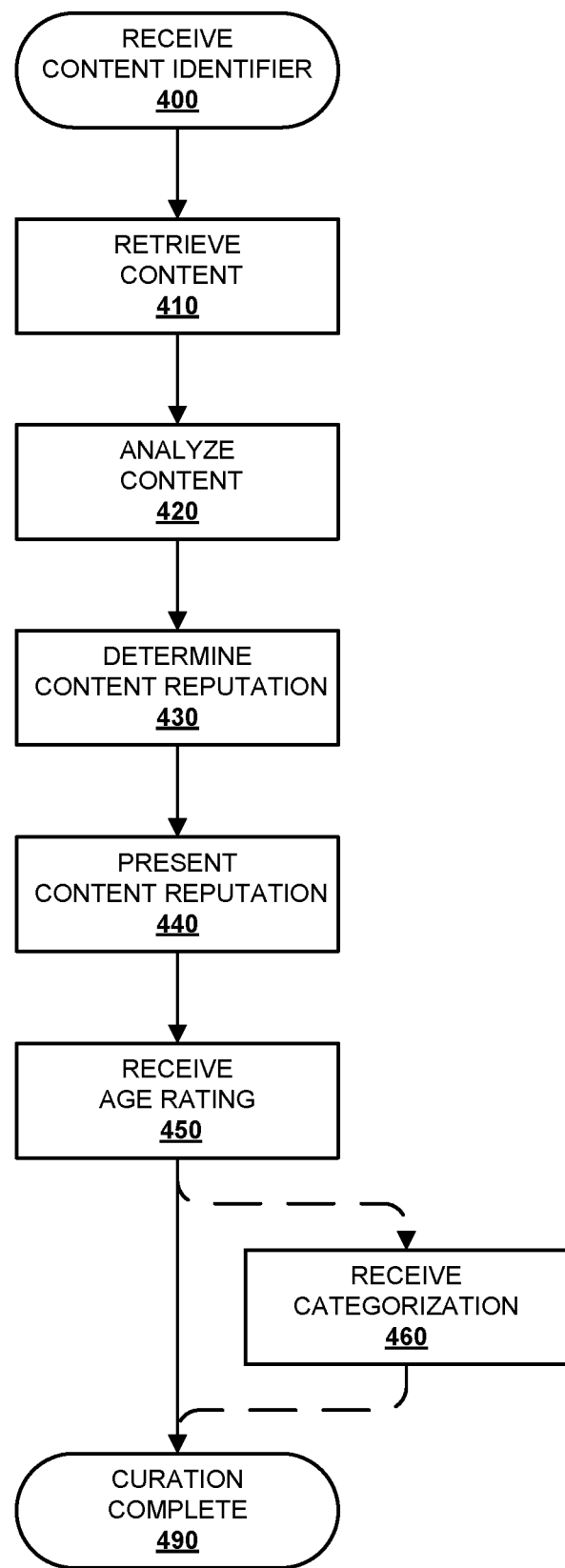
FIG. 4 is a top-level flowchart of an embodiment of creating a collection.

FIG. 4 is a flowchart illustrating a method of curation of a Collection as described above, including processing of analytics and determination of content reputation, from the perspective of the Service. In step 400 a content identifier (e.g. URL) is received by the Service from a User.

In step 410, the content is automatically retrieved from the content identifier received in step 400 by the Service. As noted elsewhere, the content identifier and corresponding content may be in various forms of a web page, audio, video, or other content.

In order to preferably make the curation process simple and fast for the User, in step 420 the Service may automatically analyze the content retrieved in step 410 to produce information helpful for the User to rate, characterize or otherwise complete the curation process.

In step 430, the Service further processes information derived from the content, aggregated data and/or other information sources to automatically determine a content reputation.

The content reputation automatically determined by the Service in step 430 is presented to the User in step 440 in the form of a summary of the content, including the previously described content reputation aspects such as children's' popularity ratings, parents' popularity ratings, appropriateness, topics of interest, geographic relevance or other derived or retrieved information.

In step 450, the Service receives an age rating from the User of the respective content for curation, which either was a result of the content reputation or manually input by the User.

As noted earlier, this step optionally may also include time/date expirations with respect to the term of the content authorization, or further specificity with respect to the scope of allowance/blocking of the content (e.g. whole website, address only, URL stem, domain, etc.).

Optionally, the User may categorize (and further optionally categorize by a dynamic taxonomy as described above) the content, which the Service receives in step 460.

Following either completion of step 460 or step 450 (if step 460 is omitted), the curation of content by the User is complete from the perspective of the Service. Of course, steps in this process may be selectively or iteratively repeated as needed or desired, or in different order than presented, without departing from embodiments.

Content Discovery

Information such as a User's age, gender, declared and observed interests, and location may be used by an embodiment to aid User's content searches and recommend relevant, age-appropriate content. Such information, when combined with automatic analysis of a User's activity, may enable an embodiment's detection of preferences that can be used to recommend relevant content to Users with similar profiles. When recommendations of content are made directly to a child, the child may access it immediately if it has been previously approved. Otherwise, the child may be required to request permission from their parents. When parents receive content recommendations for their child, they may be presented with a Reputation (described above), which may allow the parents to quickly approve or decline the recommendation based on their view of whether it's appropriate and relevant for their child.

In embodiments, aggregate data originating from content and information provided by Users about content, such as content reputation, can be utilized to determine access to content for a User. It may be that the Community becomes a third User, wherein the judgment of the Community determines whether access to content is provided to the User via aggregated data (e.g. content reputation) from the Community.

Parental Moderation

In embodiments, parents may gain confidence that their children are exposed only to appropriate content via trust relationships. In preferred embodiments, parents may review a child's approved content and remove objectionable content. Preferably, they may also specify blocked content lists, so their child will not gain access to that content in the future. Parents preferably have the capability to approve requests for trust relationships, both from and to their child, and may review content sharing activity at any time.

Collectively and without limitation, trust relationships, simplified content curation, content sharing and viewing rules, and automated analysis, may enable parents and their children to safely benefit from a vast, globally scaled collection of fresh content curated for children by a community of individuals and organizations, including children themselves.

Functionality and Usage

Functionality and usage described herein will now be explained in greater detail, organized around common User experiences (with a User story or User experiences appearing in italics) of a specific embodiment provided in the form of a Service offered to Users. This specific embodiment or embodiments, and the language describing such a specific embodiment or embodiments, should not be considered limiting of other embodiments in any way.

At a top level, a User creates an account by registering with the Service and then accesses centrally-hosted software service(s) (e.g. on a Server) using client software, such as native mobile device apps, native personal computer applications, websites/web apps, and web browser extensions-collectively known as the Clients. Software to enable the functionality of the Service is located both in those Clients and the Server and is discussed in the Implementation section.

Register to Use the Service

Adults register to use the Service (alternatively referred to as the "Service") by creating an account, which is uniquely identified by a username (e-mail address) and authenticated with a user-selected password. Adults may add children to their account, which enables the children to use the Service and provides the adult parental privileges for those children. An adult, at any time, may extend parental privileges for their children to additional registered adult Users.

Create an Account and Entity Profile

User Story: *As an adult, I can sign up for the Service, so I may use it for my family and or curate Collections for others to enjoy.*

Figure 5:
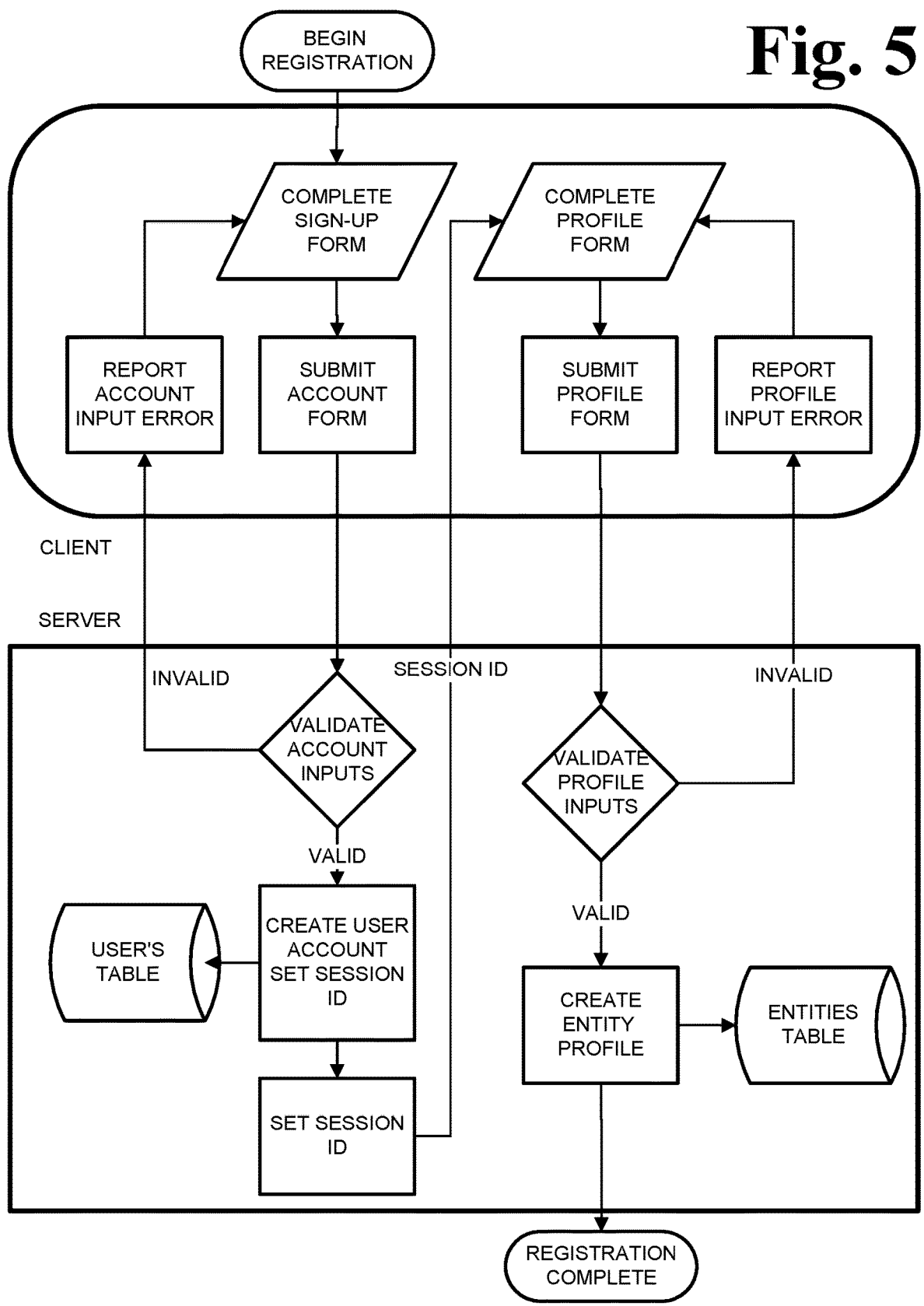
FIG. 5 is a flowchart of an embodiment of creation of an account.

Turning to FIG. 5, steps for an adult User to register for the Service are illustrated:

Steps for the Adult User:
1. Navigate to the Service website or use one of the Service native apps and select Sign Up
2. Complete the sign-up form, providing personal information including the User's email address, first and last names, age, and security information such as the account password, password-reset questions and answers, and a current SMS number (optional)—this information is private and used by the Service to manage the User's account
3. Select Submit, then entries are validated by the Service
4. If valid, the Service creates the User object in the Database and the process continues with the next step; otherwise the User is directed to correct problems with the submission and retry
5. Create the User's profile, by supplying a name/handle the User will be known to other Users as (preferably being unique, can be fictitious), postal code of location (optional), gender (optional), and topics of interest (optional)—some of this information is visible to other Users
6. Select Submit, then entries are validated by the Service
7. If valid, the Service creates an Entity in the Database and the registration process is complete and this person is now an adult User of the Service; otherwise the User is directed to correct problems with their profile submission and retry Add a Child to an Account User story: *As an adult User, I can add my children to my account, so that they may begin to use the Service (with the protections it provides children) and I can use parental permission to moderate their activity.*

Steps for the Adult User:
1. Using the client software, navigate to the People tab
2. Select Add Child
3. Complete the child profile form, providing the child's first name, last name (optional), age, gender (optional), postal code of location (optional), topics of interest (optional), and the selected name/handle for the child (preferably unique in the Service)
4. Select Submit, then entries are validated by the Service
5. If valid, the child is registered in the Service with this adult as his/her parent (i.e., an Entity for the child is created in the Database and associated with this adult's User account); otherwise the User is directed to correct problems with the submission and retry
6. To add another child, repeat this process Note: At any time, the parent User may remove children from the account, ending that child's ability to use the Service and removing information about the child from the Service (steps not illustrated).

Invite a User to be a Co-Parent for Children

User story: *As an adult User, I can specify other adult Users (such as the child's other parent and caregivers) to have parental privileges for my children, so that they may perform for them activities such as content and trust relationship moderation.*

Steps for the Adult User:
1. Using the client software, navigate to the People tab
2. Select Add Parent
3. Enter the adult User's name/handle in the search box and select Search
4. Select the intended User from the list of search results, viewing their public profile information for positive identification
5. If the desired User was not found, go back to step 3 and revise the search terms, or
select Cancel to abort the process
6. When the intended User is selected, choose Send Parent Invitation 7. The Service then notifies the selected User that they have been invited to be a Second Parent and awaits their action to accept or reject the invitation Accept or Reject an Invitation to be a Co-Parent User story: As an adult User, I can accept or reject invitations from other adult Users to be a Second Parent for their children, so I can have parental privileges for children of my choosing.

Steps for the Adult User:
1. Using the client software, navigate to the Actions tab
2. Locate and select the Second Parent invitation from the list of pending actions
3. Confirm the sender of the invitation is known by reviewing their profile
4. Select Accept to become a Second Parent for that User's children, or Reject
5. If accepted, the Service creates a one-way Second Parent relationship (i.e., the sender does not become a Second Parent for the recipient's children) from the sender's User account to this User's account.

Note: At any time either adult User may use the client software to end a Second Parent relationship (steps not illustrated).

Sign-In for Use—Adult

Figure 6:
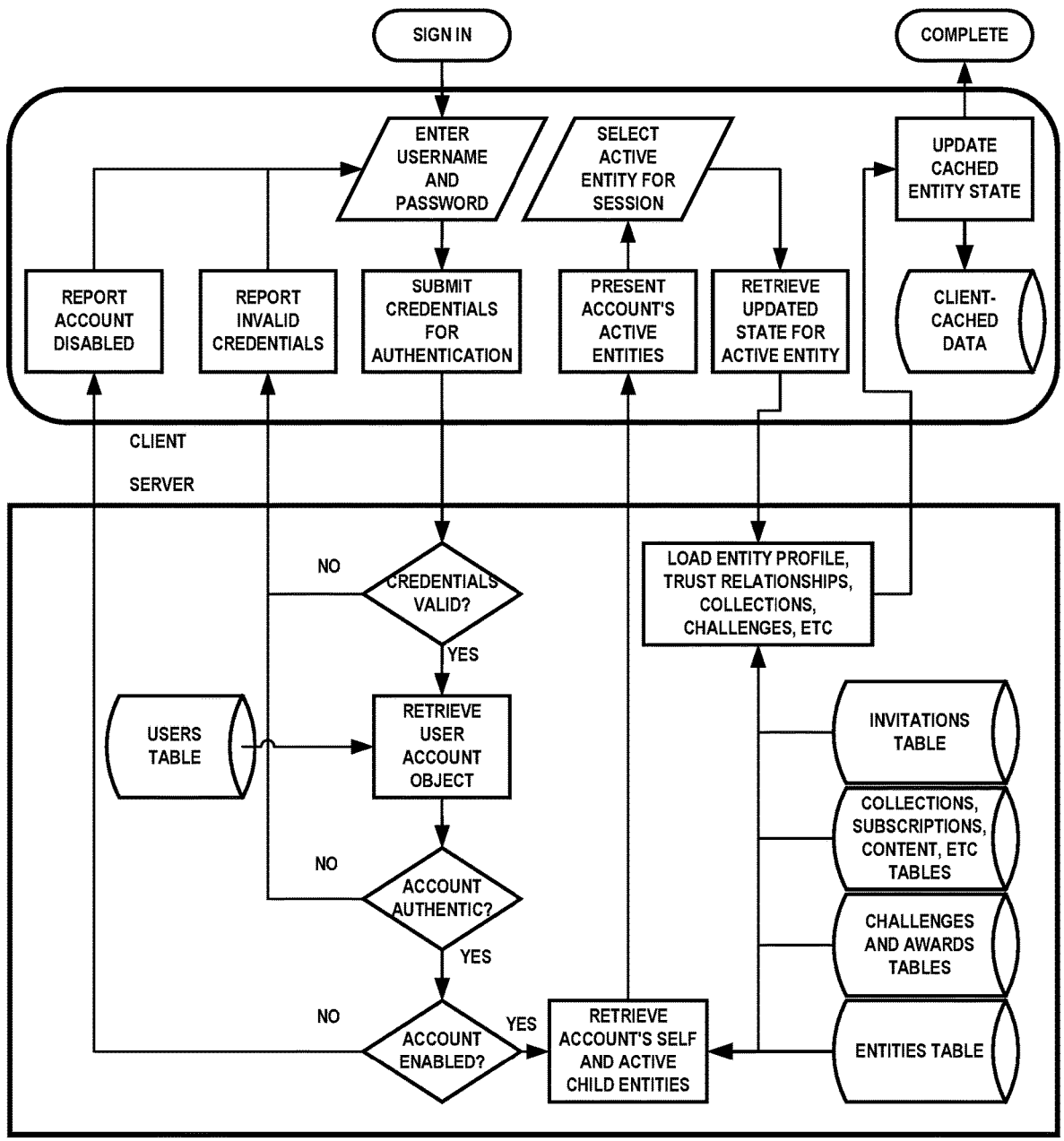

Turning to FIG. 6, steps for a User sign-in and Active Entity selection are illustrated.

User story: As an adult User, I can sign-in to the Service from my client (app or website), so that I can use the Service.

Steps for the Adult User:
1. Open the client software
2. Enter the registered User's username and password (credentials) and select Sign In
3. If the account has associated children, select the adult User's name/handle from the presented list of associated User Entities—otherwise, no selection is necessary
4. The selected User is now signed-in and ready to use the Service
5. To change Users or to end the session, navigate to the People tab and select Sign Out—the Sign In screen will be displayed, as in step 2, and can be repeated Note: When a User signs-in to use the Service, the Server creates a unique session ID and passes it to the Client. The session ID acts as an authentication token for identifying the User account for the active session and is passed by the Client to the Server with each Server request. If the Server determines the supplied session ID is valid and current (i.e., not expired), it completes the request using the authority of the session's associated User account and active Entity. Otherwise, it directs the client to end the session and prompt the User to sign-in again.

Sign-In for Use—Child

Children may not have their own account or separate sign-in credentials, simplifying the process for most families since young children do not usually have their own email address. Instead, the parent signs into their own User account and selects the desired child to be the active User for that session (until the User signs out), whether on the adult's device or the child's. For security and child protection purposes, the parent does not share their credentials with anyone-especially children.

User story: As a child User, the adult whose account I am registered with can sign me in, so that I can use the Service without the need to maintain my own account.

Steps for the Adult User:
1. Open the client software
2. Enter the registered adult User's username and password (credentials) and select Sign In
3. A list of associated Entity profiles is presented, including the adult User's and each of his/her children's
4. From the list, select the child who is to use the Service on the current device
5. To change Users or to end the session, navigate to the People tab and select Sign Out—the Sign In screen will be displayed, and step 2 can be repeated Manage Trust Relationships The following User stories capture the most common tasks for Users when managing trust relationships. While the Service treats trust relationships between Entities (Users, organizations, and Collections) as one-way (i.e., for Entity A to trust Entity B, it is not necessary for Entity B to trust Entity A) internally, it simplifies the User experience by implementing friend relationships (between two Users) as mutual trust. While one-way trust relationships may also exist between a User and an organization or Collection, the following User stories use friend relationships to illustrate relationship management functionality.

Request Trust Relationship

User Story: As a child, I can request that my parent approve a trust relationship with another User I choose, so that we may share content with each other.

Figure 7:
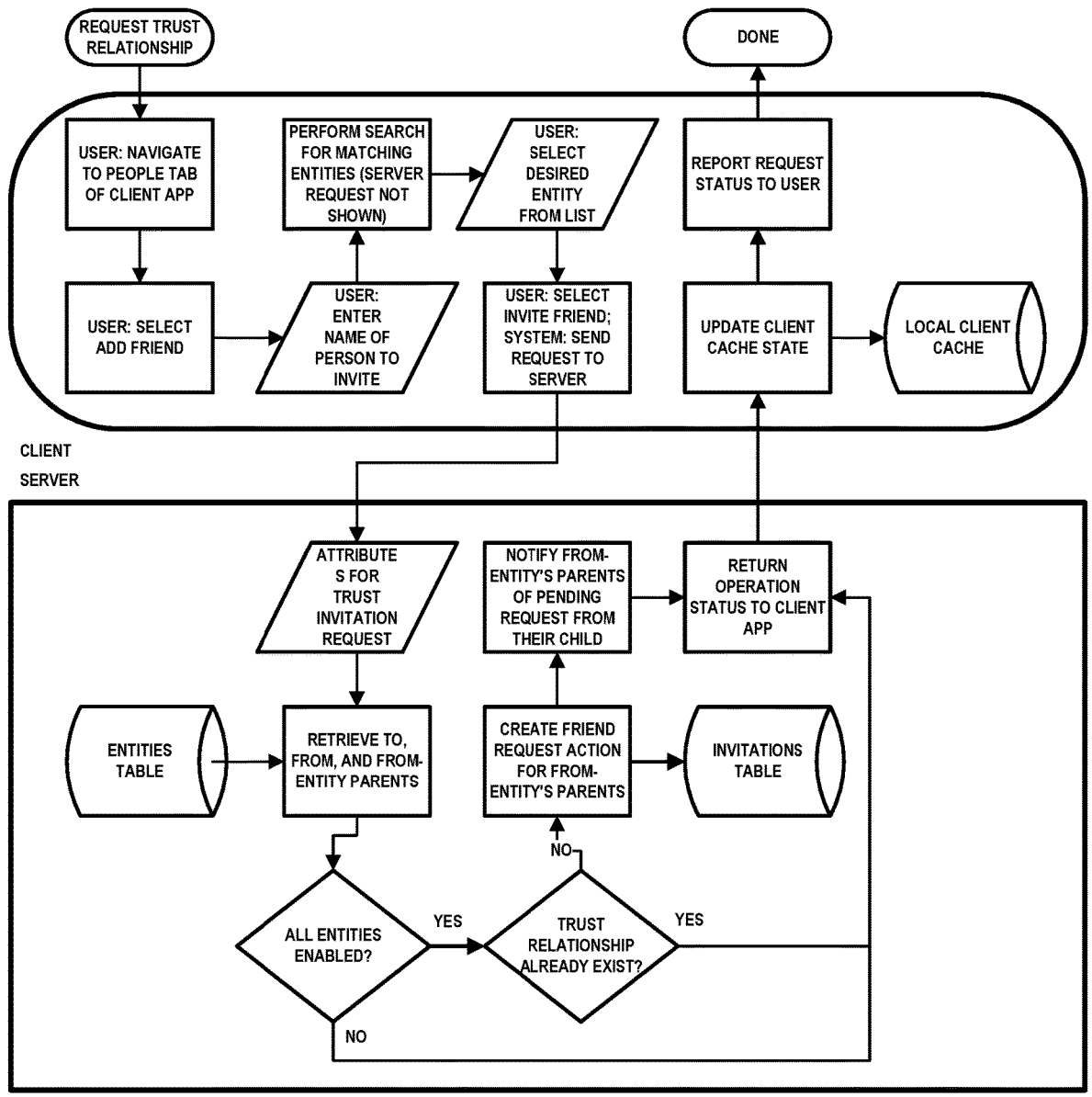
FIG. 7 is a flowchart of an embodiment of a trust relationship request.

Turning to FIG. 7, a request for trust relationship is illustrated.

Steps for the Child User:
1. Using the client software, navigate to the People tab
2. Select Add Friend
3. In the search box, enter the name/handle of the person to invite to a trust relationship and select Search
4. Select the User to invite from the presented list of User profile summaries, that match the search terms
5. Review the selected User's profile information to confirm that it is the desired User
6. If it is the intended User, select Invite Friend to send the trust relationship request to your parent for approval; otherwise, select Return To List to select another User or begin a new search
7. The trust relationship request is submitted to the Service (an Invitation is created in the Database) and the Service notifies the child's parents of the new pending friend request Authorize Invitation for Trust Relationship User Story: As a parent, I am notified of my child's request for trust relationship approval and can easily review it and submit my decision, so that a relationship invitation is sent to the selected user or the request is rejected.

Figure 8:
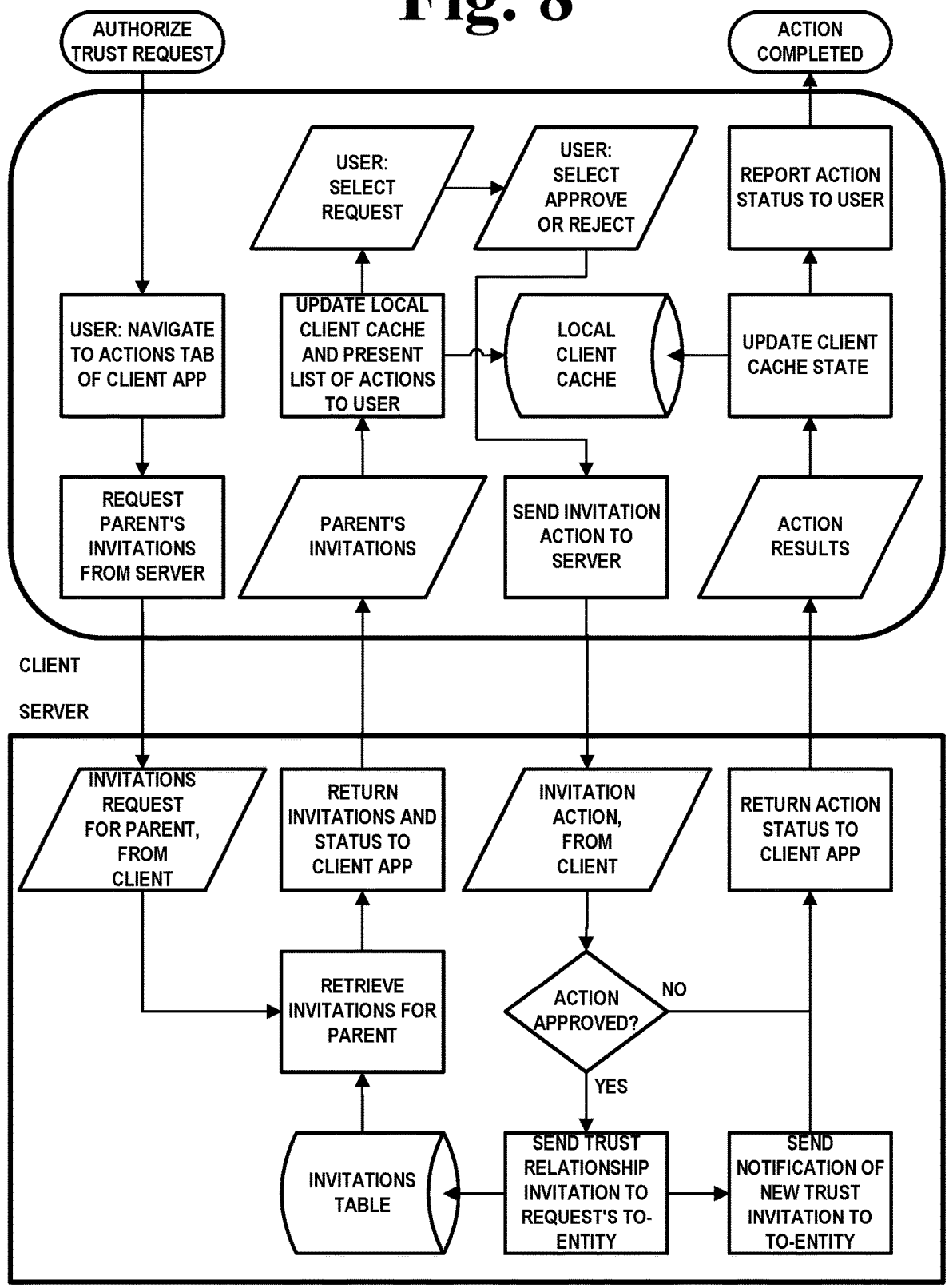
FIG. 8 is a flowchart of an embodiment of a trust relationship authorization.

Turning to FIG. 8, authorizing a request for a trust relationship is illustrated.

Steps for the Parent User:
1. Using the client software, navigate to the Actions tab
2. Locate and select the friend request in the list of requests from the child
3. Review the profile of the User identified in the friend request
4. Select Approve to send that User a friend invitation on behalf of your child or select Reject to disallow the trust relationship
5. If approved, the Service creates a trust relationship Invitation from the child to the specified User and notifies the User of the pending invitation. If the specified User is a child, that child's parents are notified of the new invitation and its processing pauses pending their approval/rejection Authorize Trust Relationship with Another User User Story: As a parent, I am notified when my child receives a trust relationship invitation and can easily review and accept or reject it on their behalf, so that content sharing with my child can happen only with people or Collections I approve.

Steps for the Parent User:
1. Using the client software, navigate to the Actions tab
2. Locate and select the friend request in the list of requests to the child
3. Review the profile of the User who sent the friend request
4. Select Approve to accept the friend request on behalf of your child and establish a trust relationship for them with that User; select Reject if you do not want sharing between your child and that User
5. If approved, the Service creates a trust relationship (captured in their respective Entity objects, in the Database) between the parent's child and the User who sent the invitation, allowing them to share content with each other End Trust Relationship User Story: As a parent, I can review and selectively terminate my child's trust relationships at any time, so that content can no longer be shared between my child and those selected individuals or Collections.

Steps for the Parent User:
1. Using the client software, navigate to the People tab
2. From the displayed list of your children, select the child for whom you'd like to review trust relationships
3. Select any trust relationship (friends or Collections) to review that Entity's profile
4. Select Remove to end the trust relationship between your child and the selected Entity
5. The Service updates the Database to remove the trust relationship between the Entities
6. If the terminated trust relationship was with another User (versus a Collection), the Service notifies that User that the relationship has ended Curate and Share Content Once accounts are registered and User profiles created, Users may curate and share content with other Users-either directly, User-to-User (via trust relationships), or by publishing to the User's own Collections. While any form of content can be curated (see additional applications, in later section), digital content is the focus of this application. For purposes of example functionality here, web pages and web sites are used because they are the most complicated of the content types (including apps, videos, images, and music).

Web Page Identification

User Story: As a User, I can easily identify individual web pages and associated groups of web pages, so content curation is quick and easy.

Curated web pages can be identified in several ways. The following list is a simple explanation of the modes included in the Service design at time of writing. Embodiments allow additional modes to be added over time, as appropriate for various content types.

A single page identified by its web address (URL). For example, "https://www.uspto.gov/patent" would match the page at that address only and no other page.

A set of pages that share the same URL page stem (i.e., beginning part, including a non-empty path). For example, a stem of "https://www.uspto.gov/patent" would match:

https://www.uspto.gov/patent
https://www.uspto.gov/patent/faq
https://www.uspto.gov/patent/filings/search
But not match:
https://www.uspto.gov/trademark
https://www.uspto.gov/https://www.sba.gov/patent A set of pages that share the same domain (e.g., "uspto.gov"). For example, a domain of "uspto.gov" would match pages with URLs in that domain and sub-domains, such as:

https://www.uspto.gov/patent/filings/search
https://filings.uspto.gov/2018/March
But not match:
https://www.sba.gov/
https://cdc.gov/
https://filings.uspto2.gov/2018/March
https://filings.uspto.com/2018/March A set of pages that share the same domain and sub-domain (e.g., domain of "uspto.gov" and sub-domain of "filings" or "filings.www")—this works like the path stem, described above, but for the page's domain and sub-domains. For example, a domain of "uspto.gov" and sub-domain of "filings" would match:

https://filings.uspto.gov/2002/March
https://mirror.filings.uspto.gov/
But not match:
https://www.uspto.gov/filings
https://uspto.gov/
https://filings.www.uspto.gov/
https://filings.sba.gov/

For example, a domain of "uspto.gov" and sub-domain of "filings.www" would match:

https://filings.www.uspto.gov/2002/March
https://mirror.filings.www.uspto.gov/
But not match:
https://filings.uspto.gov/
https://www.filings.uspto.gov/
https://www.uspto.gov/

Any set of pages (including an individual page), identified as described above, can optionally also include every page linked to from any page in the set. This is used when the curator trusts not only the principal pages, but also any individual pages they link to. In this case, however, no domain or path stemming is extended to the linked pages-only the individual linked pages are included.

Create a Collection

Users may create any number of Collections, which are sets of associated content that can either be used privately, by the User; shared with other designated Users; or made openly available to all Users of the Service. When used privately, they help a User organize their content, for easy browsing. Pages are added to Collections in the same way they are shared with Users (see examples below).

User Story: As a User, I can create content Collections, so I can organize my approved content and easily share groups of content with others.

Steps for a User:
1. Using the client software, navigate to the Collections tab
2. Select Add New Collection
3. In the dialog displayed, enter a written name (should be unique amongst the User's existing Collections) and description for the Collection—this helps others understand the Collection's charter
4. Optionally, select from the presented taxonomy topics that apply to the Collection's intended content—the Service will also analyze (using Analytics, described elsewhere in the document) the content in the Collection and report the content's distribution of topics to authorized Users, so they know the makeup of the Collection's actual content
5. Optionally, select from the list presented, the youngest age grouping for which the Collection's intended content will be appropriate-actual viewing protection will be determined by the individual content's age appropriateness rating, but this helps parents understand if the Collection will be a good fit for their child
6. If the Collection is to be shared with others, either select the checkbox to share with All Users or select the Add User button to search for a User, select the desired User from the search results, and send an invitation to the selected User to use the Collection (if the invited User is a child, their parents will receive the invitation for approval/rejection)
7. When inviting individual Users, the default Collection permission granted is read-only; the User may optionally authorize the invited User to add or delete content and invite or remove Users from the Collection (providing others the ability to co-curate a Collection)
8. Review the submitted information and select Create Collection, when satisfied (creates Collection and Subscription objects in the Database and, potentially, Invitation objects for other Users)

Adult Curates New Web Page

Figure 9:
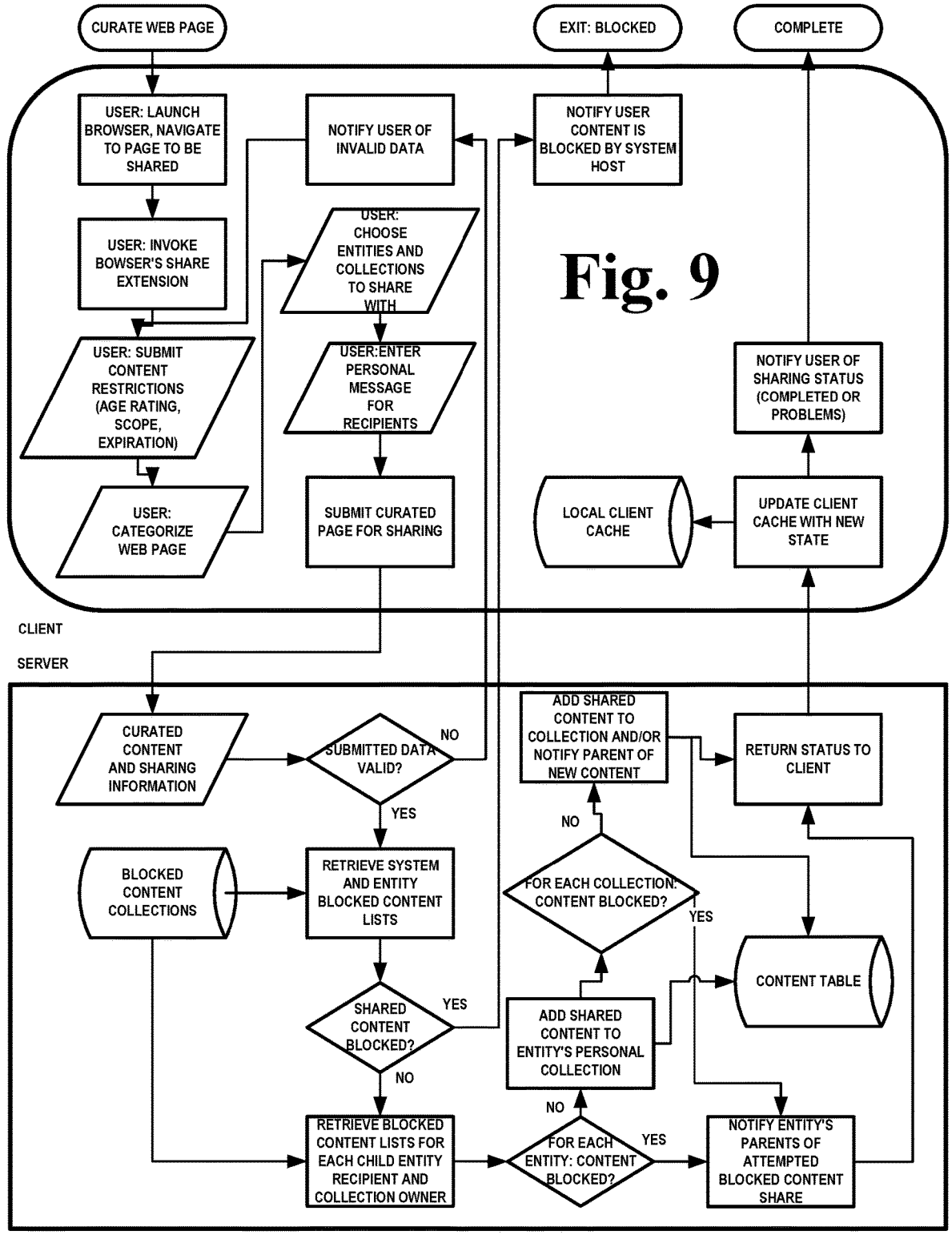
FIG. 9 is a flowchart of an embodiment of curation of a web page.

Turning to FIG. 9, an adult curating a new web page using a browser is illustrated.

Content is brought into the Service for use and circulation by Users when adults identify a content asset in the wild (such as a web page on the Internet) and then use the Service to categorize and share the content. The Service helps Users categorize the content by directing them to assign values to attributes (defined by the Service) that describe the content to other Users and the Service's own processes. The Service then makes it easy to share the newly discovered content either directly with other Users or via shared Collections. This two-step process of categorizing and sharing content is known as content curation.

Preferably, the steps taken by a User to discover, categorize, and share a web page are nearly identical regardless of whether the User chooses one of the Service native apps as their tool or one of the Service browser extensions (i.e., software added to commonly available web browsers that extend the browser's functionality in ways valuable to the extension's developer). To illustrate the utility of the browser extension, it will be used in this example. Note, children should not be permitted to use browsers directly, since the browser lacks this Service protections, and the Service browser extension for sharing content does not permit use by child Users. Instead, children should use one of the Service native client apps for using and sharing content.

User Story: As an adult User, I can discover content anywhere and share it with other Users, so it can be safely enjoyed.

Steps for an Adult:
1. Launch a web browser (e.g., Safari or Chrome) that supports one of the Service browser extensions
2. Using the browser, navigate to the desired web content (the content/page to be shared)
3. From the browser, invoke the Service browser share extension
4. The extension software presents a guided dialog for categorizing and sharing the content . . .
5. Choose what to share
   a. In the What To Share part of the dialog, select Page Only (to share this specific web page only—the default), Whole Site (all pages from domain), or any of the other options described above, in "web page identification"
6. Complete the web page categorization process
   a. Review the page's title and description (populated automatically from the page's HTML, if available) and edit as desired
   b. From the provided list, select the youngest age appropriate to use this web page (e.g., "4 and younger", "5 to 7," "8 to 9", "10 to 12", etc.)
   c. Optionally, select from the presented hierarchical taxonomy of topics (e.g., science, technology, nature, sports, cooking, movies, etc.) that apply to this web page
      i. Optionally, select deeper levels of detail from the taxonomy (e.g., Science→Astronomy→Earth→Moon)
   d. In the box provided, optionally enter keywords that apply to the web page content and that will aid search by other Users
   e. Select when the approval for the shared page(s) should expire (the default is a mode that expires the content after a period of inactivity)—this is useful if a parent wishes to temporarily approve pages their child may use, e.g., to do homework research (e.g., online wikis, search engines, news Websites, etc), and don't want to have to remember to remove them once the homework is done
      i. the User may select a specific date and time or choose from a configurable list of presets (e.g., never, in 3 hours, in 1 day, in 1 week, in 1 month, in 3 months, etc.)
7. Choose who/what to share with . . .
   a. The Service presents a list of Users and Collections this User is authorized to share content with
   b. Select desired Users and/or Collections, or select the Share All (all Users) or Share All Kids (all Users who are children) button to automatically select from the list
8. Enter a message to recipients . . .
   a. In the space provided, optionally enter a message to accompany the shared page (e.g., "The interactive tour of the Moon was awesome!")
9. Complete the process by selecting the Share button
10. The Service adds the shared content to each recipient's Personal Collection of content shared by this User and sends each a notification that they have received new content from this User—each User will find the shared content in their Personal Collection of content shared by this User
11. The Service adds this content to each selected Collection, if any, and any subscribers to these Collections are notified by the Service of new content Adorn Content with Fun Effects Users, especially children, have more fun sharing and viewing content when fun user interface effects are added to the content experience. Using web page content as an example, when a User curates content-sharing it with others directly or adding it to a Collection—they may optionally add effects of their choosing that are presented to viewing Users—when the content is opened, during use, and when navigating away. This can include sounds, animations, and combinations of each, similar to effects found in video games. To illustrate the concept, titles of effects include things, such as "party," "zap," "earthquake," "lightning,"

"rain," "tornado," "dance," "happy," "drumroll," "crash," etc. Additional effects can be awarded to Users as part of Challenges (described in the next section) offered by Collections curated by the Service operator (typically available to all Users).

User Story: As a User, I can adorn content with fun effects, so that it is more fun to use.

Steps for an Adult User:
1. During the curation process described above, in the Adornments section, select Add
2. Options for 3 adornments appear-Open, During, and After—each defaulted to None
3. To configure an opening adornment, select the list box next to Open and change it from None to one of the available effects in the list
4. Do the same for During and After
5. To preview the configured effects, select the Preview Effects button
6. Selected effect options are stored in the Content object, in the Database Steps for a Child User:
1. Using the client software to view approved content, as described below in "Use approved content," select Share from the bottom toolbar
2. From the Adornments section of the presented share dialog, perform the steps described for an adult User, immediately above Share a Web Page with Another User A key feature of the Service is the ability to safely share content directly with another User. A User, "A," may share content with another User, "B," only if B trusts A (i.e., there is a trust relationship from B to A). If A is a child, s/he may share only from the set of content that has been approved in the Service for their own use (i.e., content that has been brought into the Service via the curation process described above and shared with the child, either directly or via trusted Collections). Additionally, if A and B are both children, A may share with B only content that is designated in the Service as appropriate for B's age and younger. When content is shared with a User, that content instantly becomes approved for the recipient to Use and share with others (optionally, parents may choose to moderate content shared with their child, approving/rejecting it before their child gains access).

User Story: As a User (child or adult), I can share content with other Users who trust me, so that they may use the content themselves and share it with others.

Steps for the User, Using the Service Native Client App:
1. Using the client software, navigate to the Collections tab
2. Navigate to and select the content (web page, in this example) to be shared, so that the desired web page is loaded and being viewed—this can be done using any of the following methods:
    a. Select Search and enter search terms the Service uses to perform an algorithmic search of the User's set of Approved Content, then select the desired content from the search results list
    b. Browse Collections, by selecting a Collection from the User's list of approved Collections (including Personal Collections, which contain content shared by people they trust, and their Favorites) and then selecting from the list of content contained within that Collection
    c. In the case of a web page, enter the URL of the page to be shared—the Service limits children to their approved content, whereas adults may select any valid URL
3. Select the Share button
4. The Service presents a list of Users and Collections this User is authorized to share with.
    a. Since this content was previously curated (as in example above), its age appropriateness was set prior
    b. If the User is a child, any of their friends that are younger than the minimum appropriate age for this web page are disabled for sharing (appear grayed in list)
5. Select from the list Users that this content is to be shared with (and any Collections this content should be added to, if desired)
    a. Or, select the Share All or Share Kids button to automatically select from the list all Users or all Users who are children, respectively
6. In the What to Share part of the screen, select Page Only (to share this specific web page only, not other pages from the same Website/domain)
    a. If the User is a child, they may not share greater scope (such as whole site, versus page-only) than has been approved for them; adults may share any scope (e.g., entire domain, path stems, directly-linked pages, etc.)
7. Optionally, review and edit (if desired) the page's existing curated attributes—e.g., age appropriateness (children can increase age, but not lower), topics, this User's ratings, title, description, keywords, etc.
8. If the User is an adult, optionally select when the web page approval should expire (as described above)
9. In the space provided, optionally enter a message to be sent along with the page to the selected recipients and Collections
10. Select the Share Content button
11. For each specified recipient, if the shared content is not present in their Blocked Content List, the Service adds it to their Approved Content list and places it in the Personal Collection of content shared by this User
    a. The Service sends the recipient a notification that they have received new content from this User
12. The Service adds this content to each selected Collection, if any, and any subscribers to these Collections are notified by the Service of new content availability Invite Users to an Existing Collection A Collection may be private (i.e., accessible by its curator only), accessible by invited Users, or public (i.e., accessible to all Users). Invited Users are granted permissions by the Collection curator, which enable them to view content (minimally) and optionally add or remove content and invite or uninvite Users. Invitations and permission can be configured when the Collection is created and any time thereafter.

User Story: As the curator of a Collection, I can invite Users to the Collection, so that they may use the Collection's content.

Steps for a User Who has Previously Created a Collection:
1. Using the client software, navigate to the Collections tab
2. Select the desired Collection from the list of Collections
3. Select the Invitations menu item
4. The Service shows the Collection's configured permissions, including whether the Collection has permissions set for all Users or invited Users only, and the list of Users who have been extended invitations (along with their granted permissions)
5. Select the Invite button, the Service presents a search box, to find the intended User
6. Enter the Service profile name of the User to be invited
7. Select the desired User from the list of profiles of matching Users; view detailed User profiles as needed to verify the correct User
8. From the permissions options provided, select the check box next to each that should be granted (View is automatically selected and cannot be unselected)
   a. Select the checkbox next to Use
   b. Since no other permissions, such as Add Content or Remove Content, are desired for this User, no additional check boxes are selected
9. Select the Send Invitation button
10. The Service creates an Invitation object in the Database and notifies the User of their new invitation
    a. If the invited User is a child, their parents are also notified of the pending invitation-only parents may accept invitations to children Accept an Invitation to a Collection User Story: As a User, I can accept an invitation to a Collection that was sent to me by a User I trust, so I can enjoy the Collection's content.

Steps for a User Who has been Invited to a Collection:
1. Using the client software, navigate to the Actions tab
2. Locate the Collection invitation in the list of pending actions
3. Select the invitation to view its details
   a. The Service presents information about the Collection, including its owner, the Collection permissions granted by the owner, its title and description, and other information to summarize the Collection
4. Select Accept or Reject
5. If accepted, the Service creates a corresponding Subscription object in the Database for that User and Collection, with the permissions specified in the Invitation, and notifies the owner of the Collection that the invitation was Accepted
   a. The User may now access the Collection's content from the client software's Collections tab
6. If rejected, the Invitation is removed from the Database and the User's list of Actions Edit or Remove User's Permissions for Collection User Story: As the curator of a Collection, I can change or remove an invited User's permissions, so that their ability to access the Collection matches my preference.

Steps for a User Who has Previously Created a Collection:
1. Using the client software, navigate to the Collections tab
2. Select the desired Collection from the list of Collections
3. Select the Invitations menu item
4. The Service shows the configured permissions, including whether all Users are permitted Use access, and the list of Users who have been granted permissions (along with their permissions)
5. Select the desired User from the list; the Service displays that User's permissions
6. To edit the User's permissions, select and unselect the check boxes next to each permission to match the desired permissions
7. To remove permissions (i.e., uninvite the User), select the Remove User button
8. Select the Update Permissions button, when edits are complete
9. If changes were made, the Service updates the corresponding Subscription object in the Database, removing it if all permissions were revoked Remove Content From A Collection User Story: As the curator of a Collection, I can remove selected content from the Collection, so that the Collection contains only what I want.

Steps for a User Who has Previously Created a Collection:
1. Using the client software, navigate to the Collections tab
2. Select the desired Collection from the list of Collections
3. Navigate to the desired content by selecting it from the presented list or performing a search within the Collection
4. Select the content to be removed and select the Remove menu item
5. The client software presents a dialog to confirm or cancel the remove action
6. Select Remove from the dialog
7. The Service Removes the corresponding Content object from the Database Add Fun Challenges and Reward Achievements The Service enables Users to add fun Challenges to curated content, such as web pages. Challenges can take the form of a quiz, presented after viewing a web page to test what the User learned, or a scavenger hunt, which encourages Users to find and learn designated information from multiple web pages within a Collection. In each case, participating Users earn Challenge awards for their achievements, as configured by the Challenge's curator.

Quizzes—To add a quiz to a web page, the User uses the Service to configure questions, answers (multiple choice or short answer), rules (e.g., how many attempts are permitted per question), and awards-either when they curate the content initially or anytime thereafter. When invited Users view the web page in the Collection, the Service presents them the opportunity to take the quiz, checks their answers, reports their score, records their achievements, and administers any associated award.

Scavenger Hunts—Scavenger hunts are similar to web page quizzes but happen in reverse. Instead of navigating to a web page and attempting that page's quiz, Users navigate to a Collection, select one of its scavenger hunts (there may be any number per Collection, added or removed by the Collection's owner at any time), and then search pages within the Collection for information needed to answer the hunt's questions. When a scavenger hunt page is navigated to, the client app indicates with fun user interface effects that they found a page from the hunt. This suggests to the User that, after reviewing the content, they can return to the Collection's Challenge questions to attempt an answer. As additional required information is gathered, the User returns to the hunt's questionnaire to submit their answers. Once complete, just like for a quiz, the Service tallies their achievements and delivers any earned awards.

Achievements and Awards—When Users are successful with the Challenges described above, they earn awards specified by the Challenge's curator. When questions are answered correctly, points for that Challenge are earned. When enough points are earned, the Service delivers the Challenge's award to the User.

Awards are configurable and may take the form of something used within the Service, such as digital merit badges or trophies (small user-created graphics/icons that represent the achievement and are optionally displayed as part of recipients' User profile), user interface skins/backgrounds, and unique avatar gear; or digital payloads provided by the Challenge curator, such as electronic gift cards, certificates for online redemption (such as for downloads), binary objects downloaded directly from the Service, etc. A maximum number of awards given can be configured for a Challenge, such as if the Challenge curator wants to award a free e-book download to the first 10 Users to successfully complete the Challenge.

Create a Challenge

The first step in adding Challenges to curated content is to create the Challenge in the Service. A User defines a Challenge by specifying information such as its title/name, description (shared with other Users), award levels (the number of points required to earn an award—there can be multiple levels of award per Challenge), the Challenge's awards, and the maximum number of awards to be given for the Challenge (1 to unlimited). The Service provides options for various types of awards that can be configured and customized so that they may be unique to the Challenge.

User Story: As a User, I can create Challenges to be used with my curated content, so that others can have more fun engaging content and their accomplishments can be recognized.

In the following example, a User creates a Challenge to reward other Users for learning about the Moon. The lowest level of achievement is awarded a trophy and the highest achievement (limited to 20) is awarded a coupon code for the free download of an e-book about the Moon.

Steps for a User:
1. Using the client software, navigate to the Collections tab
2. Select the desired Collection from the list provided
3. Select the Challenges menu item; the Service displays a list of the User's existing Challenges for the selected Collection, if any
4. Select the Create menu item and then answer the questions that guide the User through the creation process
5. Enter a short title (e.g., "Moon Exploration") and concise description (e.g., "Learn about the wonders of Earth's moon and earn a trophy-learn even more and possibly be 1 of 20 Users who can download my new e-book for free") for the Challenge, including its goals and benefits for the participant
6. From the options, Create New Award or Use Existing Award, select Create
7. From the presented list of award types (trophy, avatar, UI skin, URL, text, binary object, etc.), select Trophy (for this example)
8. From the options, Create New Trophy or Use Existing Trophy, select Create
9. In the trophy configuration dialog that appears, provide the trophy's title (e.g., "Moon Explorer"), description (explaining what achievement the trophy represents), and its digital icon/image (uploaded or selected from library of stock images)
10. In the Points field, next to the newly created trophy, enter 50 (to award this trophy to Users who earn 50 points or more)
11. In the Maximum Awards field, next to the newly created trophy, select Unlimited (to award this trophy to any number of Users who achieve the required points, set in step 9)
12. Select/check the box, next to the newly created trophy, that specifies this award should not be replaced when a greater award is earned (i.e., Users will keep the trophy even if they earn the e-book download).
13. Select Add Another Award
14. Select Text from the list of supported award types that appears (similar to step 7)
15. For the award's title, enter "The Moon: Facts, History, and Secrets-E-book"
16. For the award's description, enter "The first 20 people to score 100 points will earn a coupon redeemable for a free download of my new e-book."
17. In the Award Text Label text box, enter "E-Book download coupon" (this text is displayed with the Award text to identify it to recipients)
18. In the area labeled Award Text to Deliver, enter into the text box, or upload a file containing, the delimited (e.g., commas, tabs, or newline characters) text strings that should be delivered to Users as part of the award—submit 20 distinct coupons
   a. If only one string is provided, typically all recipients receive the same text string
   b. If more than one string is provided, then the setting for maximum number of awards is automatically set to match the number of strings provided and the Service delivers the strings to recipients in the order provided
19. Note the value in the Maximum Awards field for this award was automatically set to 20 and cannot be changed by the User (because of the previous step)
20. Note there is no option (as in step 12) to specify that this award should be replaced when a greater award is earned, since no greater award has been configured
   a. Also note, only awards that live in the Service can be revoked or upgraded-award types that deliver value outside of the Service (such as text, coupons, redemption URLs, etc.) are irrevocable by the Service since they cannot be reclaimed
21. Review the entries made, correct any mistakes, and select Submit to create the Challenge in the Service (the Service creates a new Challenge object in the Database)
22. The newly created Challenge can now be assigned to questions that are defined as part of content or Collection curation Add a Quiz to a Web Page When a quiz is created, it is associated with an existing Challenge and can be added to a Collection or an individual content asset (e.g., a web page) at any time. A quiz comprises questions, answers, point values, rules, and fun user interface effects (e.g., images, animations, videos, and sounds).

User Story: As a User who has created one or more Challenges, I can add a quiz to content I curate, so that other Users can earn points toward awards in my Challenges.

Steps for the User:
1. Using the client software, navigate to the Collections tab and select the desired Collection from the list presented
2. If the quiz is meant to be associated with the Collection, versus an individual content asset within the Collection, select the Challenges menu item and then the desired Challenge from the list of Challenges that have been created for the selected Collection
   a. Otherwise, select the desired content asset from the list of content in the selected Collection
   b. Select the Add Challenge menu item
   c. Select the desired Challenge from the list presented 3. Select Add Quiz from the menu of options
4. The Service presents a user interface dialog to guide the User through the quiz creation process—it is the same regardless of whether the quiz is being added to a web page or a Collection
5. In the text boxes provided, enter a title (e.g., "The Moon's distance from Earth") and description (e.g., "Test your knowledge as your journey to the Moon") for the quiz
6. Select Add Question and the Service presents a dialog for creating a question
7. In the Answer Type area, select Multiple Choice from the options provided (Multiple Choice or Short Answer)
8. In the Question text box, type the text of the question: "How far is the Moon from Earth?"
   a. Note, answer choices can be a provided text string or an uploaded image-text is used in this example
9. In the first text box of the Answer Choices area, type the possible answer: "200 miles" a. Leave the checkbox labeled Correct Answer un-checked
10. In the next answer text box, type the possible answer: "2,000 miles"
    a. Leave the checkbox labeled Correct Answer un-checked
11. In the next answer text box, type the possible answer: "20,000 miles"
    a. Leave the checkbox labeled Correct Answer un-checked
12. Select the button Add Answer, to add another possible answer
13. In the text box that appeared under the last answer, type a possible answer: "over 200,000 miles"
    a. Adjacent to this answer, select the checkbox labeled Correct Answer, designating this as the correct answer
14. In the Question Rules area
    a. Enter 10 for the number of points awarded for the correct answer
    b. Select 2 from the list of Attempts Allowed, to allow the User to answer incorrectly once and try again— the list of options is pre-populated with 1 (no do-overs), 2, 3, Unlimited)
15. In the Answer Effects area, select from the list provided a sound or visual effect that should be played when the User answers correctly
    a. Do the same for the case they answer incorrectly
16. Select the button, Add Question, to add another question to the quiz Type
17. Using the dialog presented (like above), select Multiple Choice for the Answer
18. In the Question text box, enter: "If you could yell 'hello' loud enough (and if sound could travel through space), how long would it take for the sound of your voice to reach the ears of an astronaut standing on the surface of the Moon?"
19. Enter possible answers using the same procedure as for the first question
    a. Mark the answer, "More than 12 days on average," as the correct answer
20. In the Question Rules area
    a. Enter 20 for the number of points awarded for the correct answer
    b. Select 3 from the list of Attempts Allowed
21. In the Answer Effects area, select the user interface effects that should be presented for the correct answer and incorrect answers
22. Select Preview Quiz to confirm your Quiz functions as intended
23. When satisfied, select Submit Quiz
24. The Service then updates the associated Challenge object in the Database with the new Q&A data and, if added to an individual content asset, updates the associated Content object in the Database with a reference to the Challenge User Earns Award after Completing Web Page Quiz While viewing a web page that has an associated quiz, a User may take the quiz. When navigating away from the page, the Service reminds them they may optionally take the quiz to earn points toward awards.

User Story: As a User, I can take quizzes associated with web pages I view, so that I can earn points toward Challenge awards.

Steps for a User:
1. Using the client software, view a web page from one of your Collections (see example below for steps)
2. Select the Quiz button and the Service presents its first question
3. Answer the question incorrectly; the Service plays the wrong answer effects, specified by the curator, then notifies the User of how many more attempts they're allowed for the question
4. Select the Return to web Page button to view the page again and find the answer to the question
5. Select the Quiz button to return to the quiz and the question last attempted
6. Enter the correct answer; the Service plays the correct answer effects and notifies the User of the number of points earned for the associated Challenge
7. The Service presents the next question in the quiz and the process is repeated
   a. The User may leave the quiz at any time by selecting the End Quiz button (they may resume the quiz at any time later)
8. If the User exhausts the maximum number of answer attempts for a question, the Service notifies them and advances to the next question, if any
9. When the quiz is complete, the Service notifies the User if they've earned an award from the Challenge and/or how many more points are required to get there
   a. In this example, the User earned an award and the Service:
      i. notifies them with celebratory sounds and animation
      ii. presents the award (as configured in the Create a Challenge example, earlier) to the User
10. If there are additional quizzes/Challenges available for the Content, the Service directs the User so they may easily pursue additional awards
11. At the completion of the quiz, the Service updates associated Award objects in the Database with the User's progress and the client software returns the User to the content they had been using or the request the User had initiated when the Service offered the quiz Engage Content Embodiments enable Users to enjoy quality content in a safe way. These examples use web page content to illustrate how the Service enables Users to easily discover and use content, including requesting content approval when needed. Each example is explained for a child User, since they may access only approved content, which makes the User experience more complicated than for adults.

Browse And Search Collections

The Service presents multiple methods for finding approved content, including browsing and searching:
  browsing Collections
  browsing lists of content, organized by topic of interest
  browsing a list of approved content, organized by host domain
  algorithmic searching within a Collection
  algorithmic searching within a topic of interest
  algorithmic searching of approved content The Service enables searches by content title, description, keywords, and Internet host/location. In the case of content with text that can be indexed, such as web pages, Users may also search for terms within the content itself (similar to modern web search engines).

User Story: As a child User, I can easily find approved content of interest, so I may use it.

Steps for the child User to find an approved web page:
1. Using the client software, select the Collections tab
2. To find content by browsing Collections:
    a. From the list of Collections presented in the main screen window of the Collections tab, scroll the list and select the Collection of interest
    b. The Service presents a list of the Collection's content, sorted by most recently added
    c. Scroll the list and select the content of interest
    d. To perform an algorithmic search within the selected Collection, scroll to the top of the content list/screen to find the search text box
        i. enter search terms in the text box and select Search
        ii. browse the list of search results presented by the Service and select the content of interest
3. To find content by browsing topics of interest:
    a. In the top navigation bar of the Collections tab, select View
    b. From the menu of view options, select Topics
    c. From the list of topics presented by the Service in the main screen window, select the topic of interest
    d. The Service presents a list of content and sub topics-select desired subtopics and descend hierarchically to narrow the listed content as desired
    e. Once the desired content is presented in the list, select it
    f. An algorithmic search can be performed within a selected topic/sub-topic by entering search terms in the search text box located at the top of the list/screen and selecting the desired content from the set of search results listed
4. To find content by browsing approved content, organized alphabetically by host domain (e.g., "uspto.gov" for web pages):
    a. Select the Collection labelled All Websites (created and maintained by the Service)
    b. Use the alphabetical index in the right margin to jump the host domains beginning with the desired letter and/or scroll the list to find and select the desired content
5. To find content by performing an algorithmic search of approved content:
    a. From the top-level view (Collections or Topics), enter search terms in the search text box located at the top of the screen
    b. The Service searches approved content and returns a list of matches sorted by relevance to the supplied search terms
    c. Select the content of interest or revise the search and repeat
6. In each case, the Service presents a list of approved content that matches the selected location in the browse hierarchy or the specified search terms
7. The User may specify sort order for lists, including options for date added to Collection, relevance, alphabetical, average User rating, Favorites, etc.
8. When the desired content is selected from a browse list or search results, the Service launches it for use (in the case of a web page, it loads the web page and displays it for the User)

Use Approved Content

Figure 10:
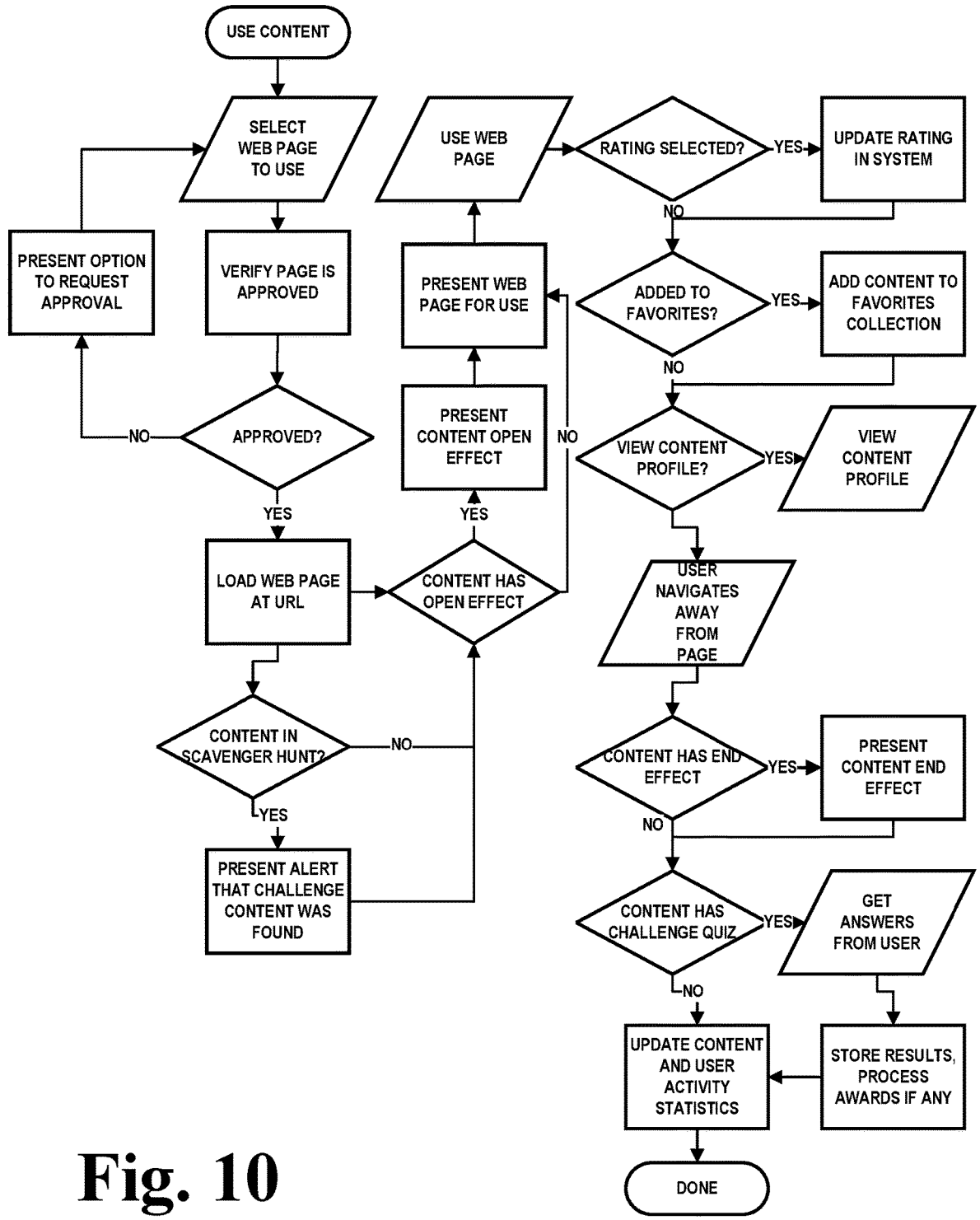
FIG. 10 is a flowchart of an embodiment of use of approved content.

Turning to FIG. 10, use of the approved content is illustrated.

Once content has been selected from a Collection, as in the example above ("Browse and search Collections"), the Service makes it easy for the User to enjoy the content. Since adults have fewer functional restrictions, this example portrays a child User engaging web page content.

Figure 11:
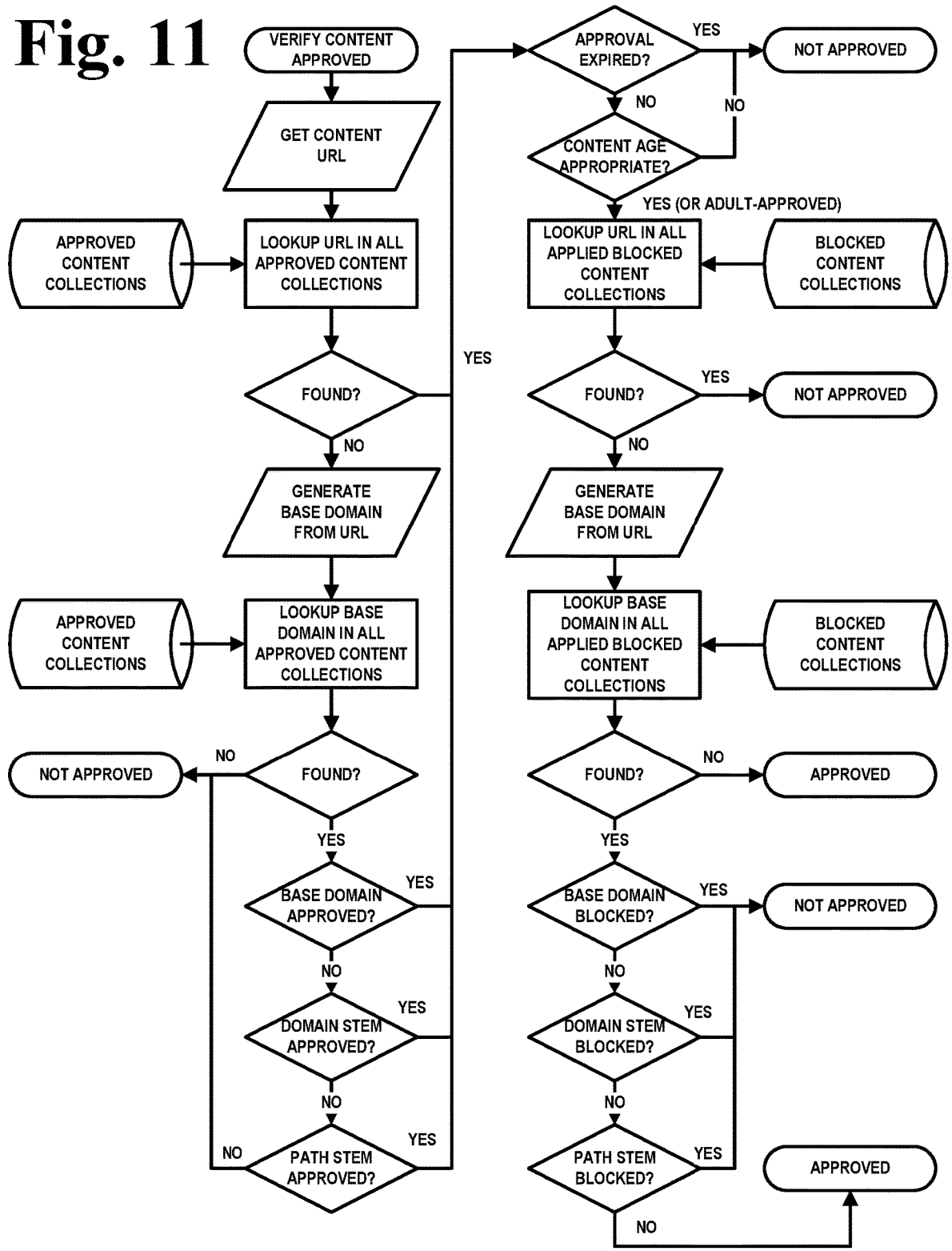
FIG. 11 is a flowchart of an embodiment of approved content verification.

Turning to FIG. 11, approved content verification is illustrated.

User Story: As a User, I can easily use approved content, so that I enjoy the content and may help others to as well.

Steps for a Child User:
1. Using the client software, select the desired web page to view (such as described in the above example, "Browse and search Collections")
2. The Service loads and displays the web page, similar to a standard web browser, but with additional functionality available to the User
3. The User views and engages content in the web page, including text, images, audio, video, and dynamic or interactive content, such as games, in the same way they would in a regular web browser
4. At any time, the User may select their content rating for this web page by selecting the Rating tool, from user interface's bottom toolbar, and then selecting their content rating (to express that they liked the content, are neutral, or did not like the content)
5. At any time, the User may view the web page's curated information by selecting the Info tool, from the user interface's bottom toolbar
    a. Information includes things such as age appropriateness, topics of interest, title, description, keywords, aggregated ratings by other Users, content reviews and commentary by friends, and any content profile information available from the Service automated content analysis
6. At any time, the User may share the content with others or add it to a Collection by selecting the Share tool, from the user interface's bottom toolbar, and then following the guided dialog to share the content with friends (described in the earlier example, "Share a web page with another User") or to select one or more of their existing Collections
    a. Content adornments, as described in the "Curate and Share Content" section may be added during this step
7. At any time, the User may add or remove the content (web page) from their Favorites Collection by selecting the Favorite tool from the user interface's bottom toolbar
8. If a Quiz is associated with the content or its Collection, the User may select the Quiz tool, from the user interface's bottom toolbar, and complete the quiz as described in the example, "User earns award after completing web page quiz"

9. At any time, the User may select HTML links or other objects within the web page that initiate the load of different content
   a. If the selected content is already approved (such as via full URL, domain, sub-domain, path stem, etc.— as described elsewhere), the Service allows the loading of the page and navigation to proceed and presents that content to the User
   b. If the selected content is not yet approved, the Service notifies the User and gives them the option to request approval from their parents
      i. To request approval, select the Request button from the presented dialog
      ii. Otherwise, select Cancel to continue using the original web page
10. The Service records content activity in the Database for optional review by parents and for use by the Service analytics Receive Content Recommendations The Service recommends content to Users, both from their set of approved content and content not yet discovered/approved, based on the User's expressed interests and those observed by the Service (i.e., automatic analysis of content curation information and User activity) with the goal of expanding the collection of quality, appropriate content available for their enjoyment. This example uses a child User, so that it may illustrate how requests work for recommended content.

User Story: As a child User, I receive content recommendations that are appropriate for my age and relevant to my interests, so I may discover and enjoy more content.

Steps for the Child User to Find an Approved Web Page:
1. Using the client software, select the Actions tab
2. Scroll to the Recommendations section, which lists a mini-summary of recent
recommendations (e.g., content and Collections) by the Service, including an indicator of whether the content is already approved or would require permission
   3. From a content's mini-summary in the Recommendations list, the User may:
      a. Select the Go To button, if the content is already approved and they'd like to open it
      b. Select the Profile button, to view more information about the content, including the Service generated content profile which helps the User quickly understand what the content is about, its appropriateness, and its popularity with other Users of the Service
         i. from the profile page, they may select the Go To button to open the content or Request button to request permission from their parents
      c. Or, for content not yet approved, they may select the Request button to request permission from their parents
   4. Recommendations in the list disappear after 30 days (or the duration specified by the Service operator) and they may be manually removed by the User by selecting the Remove button from either the lists' mini-summary or the recommendation's profile page Find a Collection and Request Approval User Story: As a child User, I can find Collections available to me and request approval by my parents, so I may enjoy more content.

Steps for a Child User:
1. Using the client software, navigate to the Collections tab
2. Select the Add button
3. The Service presents a dialog helping User browse Collections available for them to add
4. To find interesting Collections, the User may:
   a. Navigate the topics of interest taxonomy and browse the lists of matching Collections, sorted by popularity
   b. Perform an algorithmic search of Collections, by name, keyword, etc.
   c. Review Collections recommended by the Service
   d. Results can be sorted by information such as age appropriateness, popularity, level of activity, date created, etc.
5. When an interesting Collection is found, the User may review its curated information (e.g., title, description, reviews/ratings, summary of content, age appropriateness, topics of interest, popularity, etc.)
6. For any desired Collection, the User may select Request Approval—the Service then sends a content approval request for the selected Collection to their parents Moderate Child Activity Using the client software, parents control their children's approved/blocked content and trust relationships and can observe their child's activity in the Service. If trusted entities later turn-out out to be untrustworthy, parents can end that relationship. If previously-approved content changes or should not have been approved, parents may remove it-optionally blocking it from being approved again in the future.

Configure Moderation Levels for a Child

Parents may set the level of moderation desired for each of their children, individually. Moderation is available for incoming trust relationship requests (outgoing invitations are preferably fully moderated), content being shared with the child, content (including Collections) being shared by the child, and the ways they may interact with other Users (such as via messaging, content commentary and review, etc.).

User Story: As a parent, I can set the level of moderation that's right for me and my child, so that I feel confident s/he is safe while using the Service.

Steps for a Parent User:
1. Using the client software, navigate to the People tab
2. Select the desired child from those listed in the Children section
3. The Service displays the child's profile
4. Select the Moderation button
5. The Service displays this child's current moderation settings for capability
6. In the Received Friend Invitation (i.e., incoming trust relationship) area, select the radio button next to any of the following:
   a. Approve (only the parent can approve new trust relationships-default)
   b. Notify (parents are notified when the invitation is received and again following their child's acceptance or rejection)
   c. None (children accept or reject invitations on their own and no notification is sent to parents-parents can preferably review and remove current trust relationships)
7. In the Friend Request (i.e., outgoing trust relationship) area, select the radio button next to any of the following:
   a. Approve (only the parent can approve new trust relationships-default)

b. Notify (parents are notified when the invitation is sent and again if the recipient accepts)
c. None (children send invitations on their own and no notification is sent to parents-parents can preferably review and remove current trust relationships)
8. In the Content Sharing area, select the checkbox next to items that apply:
   a. Allow my child to share content with others (default on)
   b. Notify me when my child shares content with others (default off)
   c. Notify me when my child receives shared content (default off)
9. In the Interaction area, select the checkbox next to items that apply:
   a. My child may read comments (default on-allows child to read comments left by others)
   b. My child may submit comments (default on-allows child to submit comments)
   c. My child may read glyphs (e.g., icons and emojis) only (default off-restricts what the child can see to glyphs only, for extra safety)
   d. My child may write using glyphs only (default off-restricts what the child can write to glyphs only, for extra safety)
10. Settings are updated by the Service in the associated child's Database Entity object as changes are made-no save action is necessary Review Requests for Trust Relationships (Child to Child)

This functionality is covered in the section above, "Manage Trust Relationships."

Preview Content Requests and Take Action

When a child requests access to content that hasn't yet been approved, the Service notifies their parents. Parents may then review the content and utilize the Service profile of the requested content to quickly determine if the content is appropriate. Parents then select whether the content should be approved.

User Story: As a parent, I can review content requested by my child and quickly determine if it is appropriate, so that they may enjoy good content and avoid inappropriate content.

Steps for a Parent User:
1. Using the client software, navigate to the Actions tab
2. The Service presents a list of actions pending for the User
3. Scroll to the section of the list that contains actions (content requests, invitations, etc.) for the desired child
4. Find the content approval request (including requests for Collections) and select it
5. The Service presents a view of the content's curated information, if any, and the Service profile that is automatically generated from analysis of multiple sources of information
6. If the User would like to preview the content, they may select Preview
   a. The Service launches the content for use—in the case of a web page, the page is loaded and the User may explore
   b. If the requested content is a Collection, the User may browse the content in the Collection and review any User commentary, User reviews/ratings, and associated Challenges, if any
   c. Select Done or the return button (depending on content type) when previewing is complete
7. When content review is complete, select Approve, Reject, or Block (to add the content to the child's Blocked Content List)
8. If approved, the Service creates the appropriate Database objects (Content or Subscription) and notifies the child User that their request has been granted and they may now use the requested content Review And Optionally Remove Approved Content User Story: As a parent, I may view content that has been approved for, or shared with, my child and optionally remove it, so I can keep their experience safe.

Steps for a Parent User:
1. Using the client software, navigate to the Collections tab
2. Select the View menu item
3. Select the child of interest from the list of children presented
4. The Service then displays the child's approved and personal Collections
5. At the point, the parent may browse/locate and use content in the same way the child would
   a. When viewing an approved web page, for example, the Service will notify the User (parent) when navigation to content not yet approved was attempted, so that they can see the protections in place
   b. The Service then gives the parent an option to easily preview and optionally approve the content for the selected child
6. For any item of content, the parent may select the Remove button
   a. The Service presents a dialog with the following options and a button that is pressed to confirm they would like to remove that content from the child's Approved List, or Cancel
      i. The User may optionally select the checkbox next to Block Content
      ii. The User may optionally select the checkbox next to Do This for All of My Children (to execute this action for all of the User's children)
   b. If the content is part of a Collection not curated by the child, The Service adds it to the child's Blocked Content list, since the parent (or child) do not have permission to modify Collections owned by others
   c. If the content is part of one of the child's Personal Collection or self-curated Collections, the Service removes the associated Content object from the Database
7. When the User is done viewing the child's approved content, they may select View on the Collections screen (as in step 2) and then select Me from the list presented
   a. At this point, the User is back to viewing their own Collections Parents may also remove any of their child's subscribed or self-curated Collections. If it is a subscribed Collection, the Service removes the associated Subscription object from the Database. If it is a Collection curated by the child, the Service removes the associated Collection object and associated Subscription and Content objects from the Database. If others had subscribed to the Collection being removed, the Service notifies them of the Collection's removal.

Manage a Child's Blocked Content

A child's Blocked Content is the union of content assets identified in one or more Collections, including the Blocked Content Collection maintained by the Service operator (applied to children, without option), a child's Personal Blocked Content Collection, and Blocked Content Collections created by, or subscribed to (Blocked Content Collections shared by other Users), by the child's parents.

The Service creates a default Personal Blocked Content Collection (initially empty) for children. When a parent selects content to be blocked for a child, the Service adds the content to this Collection. Like regular, Approved Content Collections, parents can create and curate any number of Blocked Content Collections and optionally apply them to their children and/or share them with other Users (in the same manner Approved Content Collections are managed and shared). As such, parents may adopt for their selected children any number of self-curated or shared Blocked Content Collections. The following example uses the simplest method for managing Blocked Content. Parents may also manage content and subscriptions for self-curated Blocked Content Collections using the Collections Tab, in the same way they would for Approved Content Collections.

User Story: As a parent, it is preferable for me to be able to specify content that should be blocked from access by my child, so that I am confident they will not have access to that content.

Steps for a Parent User:
1. Using the client software, navigate to the People tab
2. Select the child of interest from the list presented
3. From that child's displayed profile, select the Blocked button
4. The Service displays a list of Blocked Content Collections applied to the selected child, including the Service's Blocked Content Collections, the child's default Personal Blocked Content Collection, and any Blocked Content Collections subscribed to by the child's parent
5. To view the content of a Collection, select it from the list
6. The user interface provides options to sort the displayed list of content by various criteria and a search text box, to perform algorithmic searches of the list
7. The Service generated profile (including data such as blocked popularity, age appropriateness, etc.) for each item of content can be viewed by selecting the content from the list
8. To remove content from the Blocked Content list, select it and then select the Remove button
    a. The Service provides a confirmation dialog with the option to do this for all children
    b. The User then selects Cancel or Remove from the confirmation dialog
    c. Note, content that is part of the Service's Blocked Content Collection or a shared Blocked Content Collection, owned by a different User, cannot be removed/permitted by the parent
9. To add content to the child's default Personal Blocked Content Collection, the User selects Add from the top-level menu of Blocked Content options
    a. The Service then presents a dialog that helps the User identify and optionally preview (for purposes of verification) the content to be blocked (e.g., for web page content, it provides the ability to identify the content as described above, in "Web Page Identification")
    b. The Service gives the User the option to block the specified content for all of their children
    c. Then the User completes the add operation by selecting Submit
    d. For each selected child, the Service creates in the Database a Content object for the identified content and adds it to the child's Personal Blocked Content Collection
10. When done, the User selects Back to return to the child's profile or navigates elsewhere in the client software Allow Others to Use Benefit from My Blocked Content Parents may share their child's Personal Blocked Content Collection and any of the parent's self-curated Blocked Content Collections with other parents. In addition to the Service's mandatory Blocked Content Collection, use of shared Collections helps parents feel confident that they're keeping inappropriate content away from their children and that included content is kept current. As with any Collection, when these lists or Collections are updated, everyone gets the latest.

User Story: As a parent, I can invite other parents to use my Blocked Content Collection for their children, so that they can benefit from the work I've done to keep my child's experience safe.

Steps for a Parent User:
1. Using the client software, navigate to the People tab
2. Select the child of interest from the list presented
3. From that child's displayed profile, select the Blocked button
4. From the list of Blocked Content Collections active for the selected child, select the Collection to share
5. Select the Share button from the screen, which includes a list of content in the selected Collections
    a. Note that the Share button is enabled only for the child's default Personal Blocked Content Collection and Collections curated by the parent User—others cannot be shared by this User
6. The Service presents a list of Users already subscribed to the Collection an Invite button
    a. To remove a User's permission, select the desired User from the list and then select the Remove button
7. Select the Invite button; the Service presents a dialog to help the User search for the User with whom they'd like to share
8. Once found, select the desired User and then select Send Invitation
9. The Service creates a Collection Invitation in the Database and notifies the invited User of their invitation Adopt Another User's Blocked Content Collection As explained above, to better protect their children, parents may use Blocked Content Collections shared by other Users (people and organizations). Since the process to find and use a Blocked Content Collection is very similar to what's done for Approved Content Collections, it is not illustrated here.

User Story: As a parent, I can use Blocked Content Collections curated by my friends, so I get better protection for my child.

Steps for a Parent User:
1. Using the client software, navigate to the Actions tab
2. Locate the desired invitation in the list of pending actions
3. Select the invitation to view more information about the list
4. Select Accept, to accept the invitation (select Reject to ignore the invitation)
5. The Service will present a list of the User's children
6. Select the checkbox next to each child for whom to apply the Blocked Content Collection
7. Select Submit; the Service creates a Subscription object in the Database for the parent and for each selected Child 8. The new Blocked Content Collection is now in effect for the selected children; for each included child, the Service removes from their Personal Collections content that is present in the new Blocked Content Collection To apply the shared Blocked Content Collection to additional children at a later time, the parent will use the Collections Tab in the client app, navigate to the desired Blocked Content Collection, and select Subscribe Child.

Review Child Activity

User Story: As a parent, I can review my child's activity in the Service, so that I can be effective in keeping their experience safe.

Steps for a Parent User:
1. Using the client software, navigate to the People tab
2. Select the child of interest from the list presented
3. Select Activity from the child's profile page
4. From the list presented, select the category of activity to review
   a. Trust relationships started and ended
   b. Content used/viewed, including time spent with each
   c. Content shared (sent and received)
   d. Content requested, with approval status
   e. Content removed
   f. Collections created, modified, added, removed
   g. Reviews, ratings, and comments submitted
5. View the log of selected activity
6. Optionally select Delete to remove and reset activity history Enable Children to Temporarily Use a Set of Predetermined Content There are times when a parent will like to temporarily relax restrictions, enabling a child access to more content. One example is when the child is using their device to do research for school assignments (i.e., homework). The Service provides this capability, casually referred to as Homework Mode. Homework Mode enables parents to specify (and save for future use) a set of Collections that are added to a child's Approved Content for a specified time period, and then automatically removed. This set of Collections can include any number (at least 1) of the parent's self-curated Approved Content Collections and those shared by others.

User Story: As a parent, I can easily enable for my child a broader set of Approved Content which is disabled automatically after a specified amount of time, so they can have temporary access.

Steps for a Parent User:
1. Using the client software, navigate to the People tab
2. Select the desired child from the list
3. Select the Homework Mode menu item; the Service presents the current configuration for this child, including the included Collections and the default enabled duration
4. To add a Collection that is to be Approved while Homework Mode is Active, select the Add button at the top of the Collections list; the Service presents a list of the parent's self-curated and subscribed Collections
5. Select from the list Collections that should be Approved when Homework Mode is enabled and then select the Add Collections button, or Cancel
6. The User is returned to the screen showing the Homework Mode configuration for the selected child
7. If desired, change the default enabled duration to the amount of time Homework Mode will be enabled before ending automatically
8. When complete, select the return button at the top of the screen or navigate to a different tab Parents may curate their own Homework Mode Collections, as they would any Collection, and subscribe to Collections shared by other Users.

User Story: As a parent, I can easily enable access to additional content that is automatically revoked after a specified period of time, so they may perform needed tasks without the risk of me forgetting to return content restrictions to normal.

Steps for a Parent User:
1. Using the client software, navigate to the People tab
2. Select the desired child from the list
3. Select the on/off switch next to Homework Mode, to change it from off to on
4. The Service presents a dialog box prompting the User to select the period of time it should be enabled before automatically returning to normal access restrictions
   a. The default setting of this control is the duration previously configured for this child's Homework Mode
5. Select OK or Cancel
6. If OK, the Service subscribes the child to the configured Homework Mode Collections with an expiration date/time equal to the current time plus the selected enabled period
   a. When the Collections' expiration date/time is reached, the Service no longer permits access to the Collections' content To manually end Homework Mode for a selected child, navigate to the client app's People tab, select the desired child, and select the on/off switch next to Homework Mode, switching it from on to off.

Implementation

Embodiments comprise software divided between components of a centrally located server (which may be hosted by many physical and/or virtual servers) and user interface functionality that resides in several client applications (apps). While each client app has the same functionality, they are necessary to offer use of the Service from multiple device types. The client apps include a web app, for easy web access from any browser; native mobile device apps (e.g., iOS and Android); and native Windows and MacOS apps, for access from traditional PCs.

Figure 12:
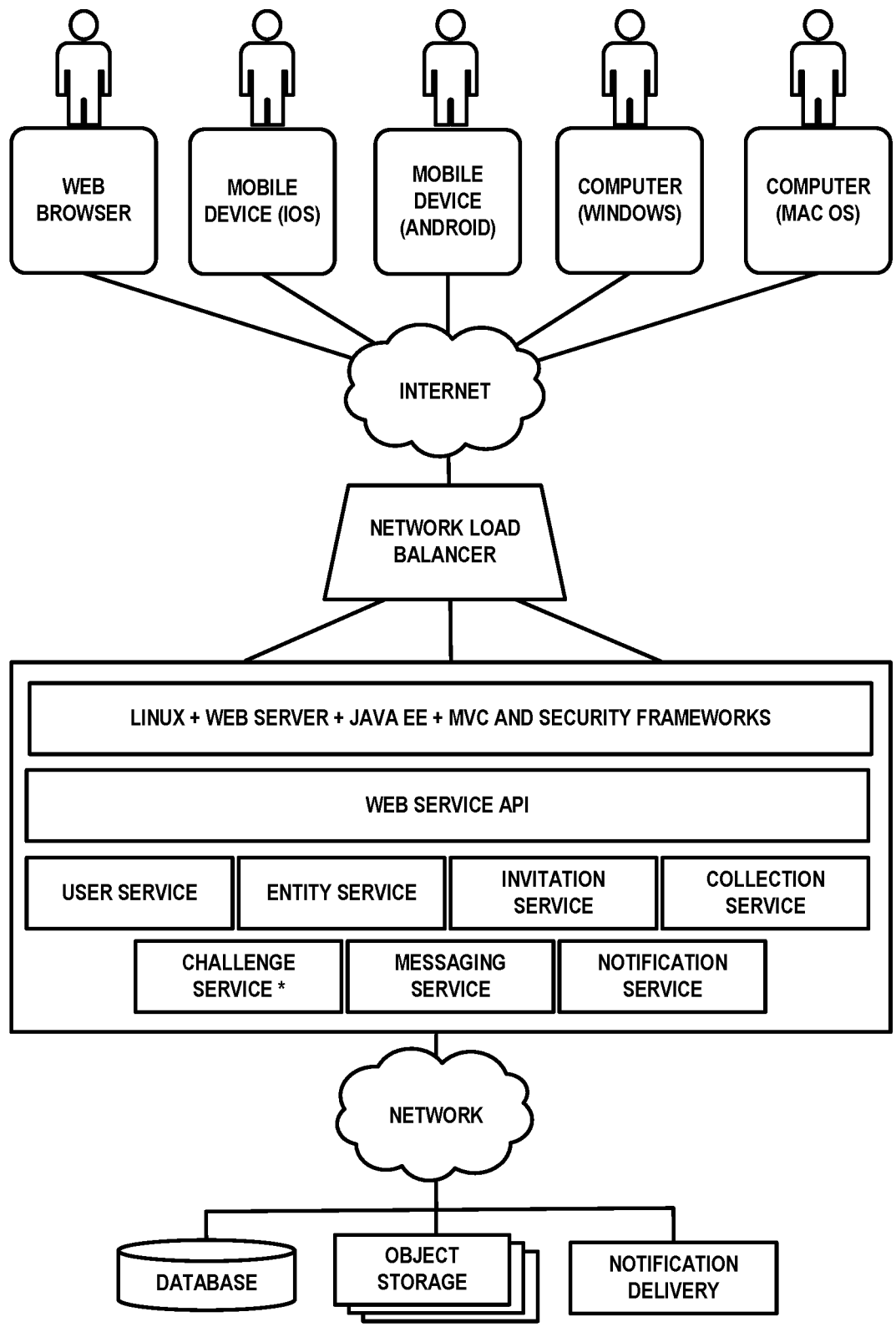
FIG. 12 is a logical diagram of an embodiment architecture.

Turning to FIG. 12, an architecture for an embodiment of the Service is illustrated.

The Service preferably comprises the following general aspects and functions, described in greater detail later:

User Accounts contain information identifying an adult User and are the foundation of the Service security Users have associated Entities (the account holder's own self-Entity and their children's Entities) and Second Parents (represented by other User Accounts)

A User establishes Second Parent relationships with other Users via

Invitations between their respective self-Entities

Entities have an associated Profile and are logical instances of people who use the Service Entities have trust relationships with other Entities Trust relationships are established via an Invitation to an Entity from another Entity or the Service (such as for Collections owned by the Service operator)

An Entity can receive content shared by a trusted Entity-shared content is added to the recipient's personal Collection of content received from the sharing Entity and becomes a member of the recipient's set of Approved Content Child Entities require approval from associated Parent Entities to perform some tasks (such as for new content approval and to request or accept new trust relationships)

Child Entities request new content approval and trust relationships from associated parent Entities via Invitations Parent Entities configure levels of activity moderation for their associated Child Entities, including content sharing, trust relationships, Entity interaction, and content usage Entities own and subscribe to content Collections Collections represent sets of Approved or Blocked Content Collections are created by Entities, including the Service operators, to help organize Content and share with others Entities share Collections they create with some or all Entities by granting permissions via Invitations Client applications enable Users to easily perform operations described above, interacting with the server to gain access to User and application state/data and to comply with business rules Client applications enable child Entities to use Approved Content only, blocking access to content that is not age-appropriate or not yet approved High-level Data Model (objects have additional attributes, described later—this summary is intended to depict relationships between data objects):

An Account is associated with a User

A User is an adult and has Entities-self, children, and Second Parents

An Entity has a type (Child or Adult), profile with unique name/handle, and trusted Entities An Invitation has to and from entities (may be an Entity or Collection), a type (implies granted authorities), and an optional expiration A Collection has a type (Approved or Blocked), a profile, a set of Content, a Thread ID for comments, optional associated Challenges, and optional Subscriptions which grant permissions to Entities Content identifies a unique content asset or set of associated assets and has a profile, a Thread ID for comments, optional associated effects, optional associated Challenges, and an optional expiration Threads have an owner (Entity or Collection) and optional restrictions for messages from Participants A Participant grants an Entity permission for Messages in a Thread and holds the Entity's join and leave dates for the Thread (determining which of the Threads Messages are visible to the Participant)

Messages capture an Entity's submission to a Thread

A Challenge is associated with a Collection or Content and has a profile, challenge questions/answers, scavenger hunt items, and configured rewards Awards have an associated Entity and Challenge and track that Entity's progress and achievements for the Challenge Notifications store intermediate platform-specific endpoints for an Entity's platform-specific device tokens, used for sending client app notifications The Server The server stores operational/application and user state/data, enforces the Service business rules, performs data analysis, processes user notifications, and provides identity, authentication, and authorization for Users. Client applications interact with the various components of the server via the Internet and the server's RESTful web service application programming interface (API), enabling use from the User's chosen device, anywhere in the world. The server's code is written primarily in Java and its components include the following.

Database

Most services of the Server depend on a shared database used to persist (i.e., store long-term) user and operational/application state (i.e., data). The data model in embodiments is designed so that the database can be implemented and operated in a high-performance, low-cost way using any of many available standard commercial and open-source relational (e.g., MySQL) or non-relational (e.g., NoSQL, such as Amazon DynamoDB) database management systems. The database may be either co-located with the other server components or hosted remotely and accessed via a network (e.g., in the cloud, accessed via the Internet). Current embodiments utilize a commercial cloud-hosted NoSQL-style database.

Object Store

Some functions of the Server (and client applications, described separately) depend on durable, long-term object (i.e., structured data and binary objects stored as files) storage for internal server function and for communicating data to the Service client applications. The object store preferably should be remotely accessible via the Internet by both the Server and client applications, highly available, and implement security capabilities that enables the Server to dynamically grant/limit access (e.g., read, write, delete) to data based on its associated business rules and the authenticated identity of the Service components and/or user attempting access. Any of a number of available commercial and open-source object storage solutions may be used. Current embodiments utilize a commercial cloud-hosted object store, although alternate solutions can be used with equal success.

Notification Delivery

Various functions of the Server send notifications to Users or client application instances in the forms of native device push notifications (such as via Apple Push Notification service and Google Cloud Messaging), SMS text messages, and e-mail. The Server may use a commercially available cloud-hosted service for delivering messages, defined and addressed by the Server, to these types of endpoints.

Web Service API

As the Service interface preferably responsible for all client software communication, this API exposes the server's functionality to authorized clients and users, as implemented by the services described below, necessary to support the user experience as delivered by the client applications. Its role is to authenticate and authorize user and application requests from clients (rejecting others), validate the correct form of submitted requests (rejecting with error code provided, when not), route the request to the API code associated with the request's endpoint, process the request by calling private APIs provided by the Service internal services (described below) and assembling results, formatting and returning the results to the requesting client (including the resulting status, which might be an error), and logging the activity for later analysis and diagnostics.

This API is built for use with (i.e., dependent on) the following combination of common, open-source software packages.

Java Servlet Container and web server (e.g., Apache's Tomcat)

Java Servlet-based web framework for Model-View-Controller (MVC) designs (e.g., Spring's Spring Framework)

Java Servlet-based security framework for customizable authentication and access control (e.g., Spring's Spring Security)

User Handler

The primary roles of the User Handler are to manage the storage, integrity, and security of the User object (data attributes describing each User Account, including User identity and means for authentication, and relationships to other User Accounts and Entities), implement business rules, and maintain relationships associated with User Accounts. User objects are persisted by the Database in the Users table. Among other things, the User object contains the following attributes:

The User's unique identity (their email address)—the User object's primary key

A randomly assigned unique identifier (random string of text and digits), for purposes of identifying the User Account without using personally identifiable information—an alternative User object primary key The User's first and last name The User's sign-in password, security questions for password reset, and SMS contact number for second factor authentication The User's set of associated Self Entity IDs (described next, in Entity Handler)

The set of Entity IDs for each of the account's associated child Users (i.e., a parent's children, who use the Service-aka, Child Entities)

The set of User Accounts (identified by the User object primary key) that have been designated a Second Parent for Child Entities in this account The set of User Accounts (identified by the User object primary key) for which this account has been designated a Second Parent The set of authorities associated with this User, such as User, Subscriber, Parent, Administrator, Support, etc.

The following list describes User Handler API functionality carried out primarily by the User Handler (i.e., those without significant dependence on other services):

Create new User Account

Update/get User Account profile, including attributes such as first/last name,

SMS contact number, security questions, etc.

Disable/enable/delete User Account

Change User Account password

Add/remove/get account authorities

Add/remove/get Self Entity(ies)

Add/remove/get Child Entity

Add/remove/get Second Parent relationship(s)

Add/remove/get Second Parent For relationship(s)

Get Child Entity's parents' Entity IDs (the Entity IDs of the primary and secondary parents)

Since the User Handler authenticates and authorizes user actions, it participates in most server activity and makes calls to other services, including the Entity Handler, Invitation Handler, Collection Handler, and Notification Handler. User Handler APIs with functionality limited to authorizing user access, calling APIs from other services and passing through results back to the web service API (i.e., authorization wrappers), are not described here and are covered by the descriptions of other respective services.

Entity Handler

In the Service, an Entity is a logical representation of a User instance that is associated with a single User Account (described above) and defines trust relationships between Entities (there are also trust relationships with Collections, managed by the Collection Service). It is uniquely identified by a randomly-generated Entity ID (a 12-digit, case-sensitive string of letters and digits) and has associated profile attributes, including the name, or handle, which preferably is unique amongst other entities. Entities are typically designated to represent either an adult or child User, which informs the logic of various services and affects the outcome of some business rule evaluations.

ne of the primary roles of the Entity Handler are to manage the storage and integrity of the Entity object, implement associated business rules, and maintain relationships associated with Entities. Entity objects are typically persisted by the Database in the Entities table. Among other things, the Entity object contains the following attributes:

The Entity ID and Entity type (adult or child)—the Entity object's primary key

The unique ID of the Entity's associated User Account—the User object's alternative primary key User profile information, such as the name/handle, first and last name, birth month and year, postal code, gender, and the storage location of the User-specified profile image The set of Entity IDs trusted by this Entity (trusts relationship)

The set of Entity IDs that trust this Entity (trusted-by relationship)

The set of push notification device tokens that identify client devices used by this Entity (If Entity is a child) Child activity moderation settings, such as for content sharing, trust relationships, Entity interaction, and content usage Homework Mode settings, including selected Collections and the default enabled period Profile attributes produced by the Service Analytics capabilities Key Entity Handler API functionality includes the following:

Create new Entity (adult or child)

Enable/disable/delete Entity

Confirm profile name/handle is available and valid (allowed)

Update profile (first/last name, profile image, month/year of birth, etc.)

Add/remove push notification device token

Add/remove trust relationship

Get trusts/trusted-by relationships

Add/remove Homework Mode Collection

Set Homework Mode default enabled period

Enable/disable Homework Mode

Update/get Analytics-produced profile

The Entity Handler has dependencies on the Invitation Handler, Notification Handler, Collection Handler, Challenge Handler, and Messaging Handler. Entity Handler APIs that serve primarily as an authorization (e.g., for Entity-related business rules) wrapper to APIs of these other services are not described here—that functionality is described with the other respective services.

Invitation Handler

Requests in the Service, including trust relationships, secondary parent relationships, and content requests from children, are managed by the Invitation Handler. Invitations are authorizations from one Entity to another for the recipient to do something on the sender's behalf. For instance, if Adult Entity A invites Adult Entity B to be a Second Parent, Entity B is authorized in the Service (while the Invitation is valid) to set itself as one of Entity A's Second Parents (by accepting the invitation—the Service makes the necessary relationships and cleans-up the Invitation).

The Invitation Handler manages the storage and integrity of the Invitation object (data attributes describing each Invitation), implements business rules, maintains relationships associated with Entities, Collections, and other objects, and performs housekeeping on Invitations. A single Invitation object stores active invitations between two Entities or requests between a Child Entity and her/his parents. Invitation objects are persisted by the Database in the Invitations table. Among other things, the Invitation object contains the following attributes:

- The Entity ID for the Entity the Invitation is TO—the primary/hash key
  - If this Invitation object represents a child's request to their parents, a special string known as the Parent Key is stored for the value of this attribute, enabling access by parents (current and future) of the child FROM Entity
- The Entity ID for the Entity the Invitation is FROM—the secondary/sort key
- The set of trust relationship invitations, if any, including the issued date for each
  - If this Invitation object represents a child's request to their parents, each element of this set also includes the TO Entity ID of the intended recipient
  - Otherwise, in practice, this set will be empty or have a single element
- The set of secondary parent invitations (the FROM Entity typically being an adult), if any, including the issued date for each (in practice, this set will typically be empty or have a single element)
- If this Invitation object represents a child's request to their parents, the set of Content approval requests, including the Content ID and requested date for each
- The set of Collection invitations, if any, including the Collection ID, offered Collection permissions, and issued date for each
  - If this Invitation object represents a child's request to their parents, the invitations in this set represent Collection approval requests from the child Key Invitation Handler API functionality includes the following:
- Add/remove trust relationship invite
- Add/remove secondary parent invite
- Add/remove Collection invite
- Add/remove Collection request
- Add/remove Content request
- Get parent requests from child Entity
- Get Invitations from Entity
- Get Invitations to Entity
- Get Invitation to and from Entity
- Delete Invitation to and from Entity Collection Handler The Collection Handler stores Approved and Blocked content in an organized way, providing a means for easily discovering Collections and individual content assets. It applies an Entity-based permissions/authorization model and implements the Service content-associated business logic. Entities are able to create, share, and perform ongoing management of their own Collections and participate in Collections created by others, including those curated by operators of the Service.

The Collections data model comprises 3 related objects: Collection, Subscription, and Content. Content is an abstraction for any type of content asset and is used in this application of embodiments to represent digital content assets. The Content class is sub-classed to capture unique attributes of specific content types (e.g., web pages, video, music, images, and apps). The design and functional illustrations provided here use web pages as the specific content asset type.

Collections

Collection objects define the Collection and configure its permissions. They are persisted by the Database in the Collections table. Among other things, the Collection object contains the following attributes:

- The Collection ID (unique string identifying the Collection)—the object's primary/hash key
- The Collection owner's Entity ID
- The Collection's content approval mode: Approved or Blocked
- The Collection's profile: title, description, minimum age appropriate, the set of topics of interest
- Collection's Global Use permission enabled flag (default is false, incitation only)
- True if all members of the Community may use the Collection (Use permission); the Service makes it discoverable to all
- Ratings enabled flag (default is true)
- True if User Collection ratings are visible to other Users
- Comments enabled flag (default is false)
- True if Users are permitted to submit Collection comments (visible to other Users)
- The set of this Collection's aggregated popularity ratings, by gender and age
- Each gender/age group contains the number of ratings and ratings average
- Thread ID of the Collection's comments
- Content expiration policy-Never, After Duration, After Duration Since Last Use
- Expiration duration (how long to wait before automatically deleting content from Collection)
- Profile attributes produced by the Service Analytics capabilities Key Collections Service API functionality associated with Collections includes the following:
- Create/get/enable/disable/delete Collection
- Update Collection profile
- Update Collection Global Use permission setting
- Update ratings or comments enabled flags
- Submit/get Collection rating/s
- Submit/get Collection comment/s
- Update Collection expiration policy and duration
- Update/get Analytics-produced profile Subscriptions Subscription objects grant permission to an Entity for a Collection. They are persisted by the Database in the Subscriptions table. Among other things, the Subscription object contains the following attributes:

- The subscriber's Entity ID—the object's primary/hash key
- The Collection ID of Collection subscribed to—the object's secondary/sort key
- Date/time subscribed
- The set of permissions granted to this Entity for this Collection:

The set of permissions, including values such as: View Content (see what content is in Collection, Use Collection (content, reviews, comments, etc.), Add Content, Remove Content, Moderate (reviews and comments), Update Content (curated attributes for existing content), Invite (grant permissions to additional Entities, Edit (the Collection's profile)

Most Entities will be granted the Use Collection permission only—other permissions are available for the Collection owner to grant varying degrees of co-ownership permissions to additional Users Key Collections Service API functionality associated with Subscriptions includes the following:

Create, get, update, delete Subscription

Content

A Content object is a member of a Collection and represents individual content assets or sets of associated assets (e.g., web pages that share the same host domain). They are persisted by the Database in the Content table. While some Content object attributes typically may apply to all content, others depend on the sub-class of the content, including examples such as web Page, App, Video, Image, and Music. A Content object of sub-class Music could represent a song or an album (i.e., set of songs released together). It would have attributes such as artists, title, playing time, year released, album art, lyrics, etc.

Among other things, the Content object contains the following general attributes. Attributes specific to the web page content sub-class are also included.

The Collection ID—the object's primary/hash key

The Content ID (uniquely identifying an individual asset or set of associated assets, depending on the value of others object attributes, explained next)—the object's secondary/sort key Content type (e.g., web Page, App, Video, Image, and Music)

The object's/asset's network location (usually a URL pointing to an Internet location)

For purposes of this document, URLs take the basic form of: scheme://domain: port/path? query #fragment Scheme is the protocol used, such as http or https-optional, the default is http Domain identifies the network Internet Protocol (IP) address(es) of servers where the asset is hosted, such as uspto.gov or www.nps.gov, and can instead be a literal IP address (e.g., 10.1.2.3)—required Port is the Transmission Control Protocol (TCP) port, such as 80 or 443, of the web servers hosted by the domain when the assets can be found-optional, default is scheme-dependent (e.g., 80 for http)

Path is a set of zero or more string identifiers separated by slashes ('/') (like a file directory path, e.g., learning glossary) which, together with the query string (if any), identifies the specific asset hosted by the web server identified in the earlier part of the URL-optional Query is a non-hierarchical set of attribute-value pairs preceded by a question mark ('?') and separated by a delimiter (e.g., a semi-colon or ampersand), e.g., ?att2=val2;att1=val1;att3=val3-optional Fragment is preceded by a hash symbol ('#') and serves as an identifier to a secondary resource associated with the identified asset, such as a location within an HTML document, e.g., http://www.uspto.gov/glossary#sec-m identifies Section M of the glossary asset hosted by the web server (http scheme) at port 80 (the default) on servers at the IP address(es) associated with the domain of www.uspto.gov)—optional The Content's enabled flag (not accessible by Users when false)—default is true The Content's profile and curation information: title, description, minimum age appropriate, set of content topic categories, preview image URL (application's download location of image used for content's profile)

Referrer Entity ID (Entity that added content to Collection)

Date/time added to Collection

Date/time content last used

Content use count (number of times content used by Entities)

Expiration policy (defaults to what is specified by the Collection)—Never, After Duration, After Duration Since Last Use Expiration duration (how long to wait before automatically deleting content from Collection)

The set of this content's aggregated popularity ratings, by gender and age

Content comments Thread ID

Content effects selected to present at Open, During, and After stages of content use-values are identifiers of implemented effects, default is none If Content type is web page:

Domain stem option—None, Match, or Stem

If Match, then this object matches the set of web pages having the same domain as the object's URL (in the Internet location, above) and any scheme, port, path, query, and fragment—e.g., a URL of http://uspto.gov will match web pages http://uspto.gov/1.html, https://uspto.gov/2.html, etc.

If Stem, then this object matches the set of web pages that have the object URL's domain as their root domain (i.e., the rightmost part in the string), e.g., an object URL of http://uspto.gov will match web pages with URL domains such as https://www.uspto.gov, https://filings.uspto.gov, and https://www.filings.uspto.gov/

Path stem options—None or Stem

If Stem, then this object matches web pages (assets) that have the same URL domain as this object's URL and a path that matches or begins with this path of this object's URL, e.g., an object URL of http://uspto.gov/filings would match URLs such as https://uspto.gov/filings/howto and http://uspto.gov/filings/howto/research?page=1

The set of associated Challenges (each element is the Challenge ID)

Profile attributes produced by the Service Analytics capabilities Key Collections Service API functionality associated with Content includes the following:

Add content to Collection

Get/update/enable/disable/delete content by Collection ID and Content ID

Get/update Content profile

Update Content date/time last used and use count

Submit/get Content rating/s

Submit/get Content comment/s

Update Content expiration policy and duration

Update content effects

Add/get/remove associated Challenge

Get the set of Content with the specified Collection ID

Get the set of Content with the specified Content ID
Update/get Analytics-produced profile Content ID The Content object's Content ID (secondary/sort key) is based on the object's (content asset's) network location (such as its URL), so Content queries can be done using the object's network location. Since some database management systems (DBMS) limit index key length and network locations can be very long, a solution was needed to create a key that preserved as much of the object's network location as possible, for searching and sorting, and could be limited in length to satisfy DBMS requirements. Since multiple network locations can reference the same object, they are also normalized—based on the scheme (such as a URL) used to create the original network location—so that each Content object is represented by a single Content ID. The following explanation is based on a maximum key (i.e., Content ID) length of 1024 bytes and uses the process of adding a content asset to the Content table to illustrate the design.

Process for adding a content asset, having a long network location, to the Content table:

1. The Content ID is equal to the Content object's normalized network location, if it is less than 1024 bytes long
    a. The full, original network location is also stored in an object attribute—the DBMS preferably imposes no maximum length on this attribute or it preferably is of sufficient size for network locations
2. For network locations of length greater than or equal to 1024 bytes, a hashing scheme is used to shorten them in a way that preserves efficient searching and sorting
3. The Service hash scheme preferably splits the long network location (1024 bytes or greater) into 2 strings: the first 1020 bytes (head) and the rest (tail)
4. A simple string hash function (Java's standard implementation) is used to produce a 32-bit signed integer hash value of the tail string
5. That hash value is converted into a 4-digit hash string by:
    a. making it positive by taking its absolute value
    b. finding the result of that value modulo 14,776,336 (62 raised to the $4^{th}$ power), which can be encoded in a 4-digit unsigned radix-62 number
    c. producing a 4-digit ASCII string representing the value of the previous result by converting it to its radix-62 representation, using characters from the range [0-9,A-Z,a-z] as digits ('0' least significant, 'z' most significant), and padding on the left with '0'
6. The candidate Content ID is formed by concatenating the head string with the 4-digit hash string produced in the preceding step, resulting in a string that is 1024 bytes in length
7. Content IDs have the following properties:
    a. A Content ID is known to be hashed if its length is 1024 bytes
    b. A Content ID of length less than 1024 bytes is not hashed and corresponds to exactly 1 network location
    c. Content IDs (hashed and not hashed) sort in ascending value order lexicographically, enabling query functions like BETWEEN and >=
8. Other objects present in the Content table could have the same hashed Content ID, since:
    a. Any 2 objects with different network locations, but having the same head string, could result in the same hash value (known as a hash collision)
    b. An object with the same network location (i.e., the same content asset) may already exist
9. Hash chaining is used to search for an object with a matching network location and to find an available hash value to use for the object being added (so existing objects with the same Content ID are not overwritten)—the following procedure is performed, resulting in either locating (i.e., determining the Content ID of) an object with the same network location already in the Content table or finding an unused position in the hash chain for storing the new object:
    a. A lookup is done in the Content table of an object having a Content ID (the search Content ID) equal to the candidate Content ID (initially produced in step 6 and updated in step 9.c.ii.2)
    b. If no such object is found, this content asset is not already represented in the Content table and there is no hash collision (i.e., this hash value is available in the chain)
        i. The new Content object is written to the Content table using the candidate Content ID
        ii. The process is complete-stop
    c. Otherwise, this content asset either already exists in the Content table or there is a hash collision—the following process is used to resolve:
        i. If the value of the network location attribute (the full-length location) of the retrieved object equals the network location attribute of this object, then the content asset already exists in the Content table with Content ID equal to the search Content ID-stop
        ii. Otherwise, an object with a different network location is already using the search Content ID, so find the next position in the hash chain and repeat:
            1. advance to the next position in the hash chain by incrementing the hash value portion of the search Content ID and wrapping-around to 0 if the incremented value overflows out of 4 digits (i.e., if the incremented result is decimal 14,776,336)
            2. create a new candidate Content ID by concatenating the head string with the new 4-digit hash string matching the value produced in the preceding step
            3. go to step 9.a and repeat the process using the new candidate Content ID
10. A 4-digit radix-62 value is used for the hash value to make collisions unlikely, for better create and query performance, and to leave plenty of room for objects having the same head string
    a. This scheme allows for 14,776,336 objects having the same head string (i.e., each having the same beginning 1020 bytes of their network location)
    b. While unlikely, it's possible for this space to become exhausted, in which case an exception is reported to the calling code Personal Collections The Service automatically creates two types of Collections, known as Personal Collections, for each user Entity. The first type is the Entity's Favorites Collection, which holds content the User designates as a Favorite. Its purpose is to provide the User with quick access to the content they like most. The second type of Personal Collection is for sharing. Typically, when a trust relationship is established between Entities, the Service creates a Collection (owned by the Service) and grants View and Use Content permission to the trusting Entity and Add Content permission for the trustee Entity. When one Entity shares content with another, the Service adds that content to such a Collection. Since these are special Collections, the Service may impose logic/rules unique to this type of Collection.

Blocked Content

The Service denies access by a Child Entity to content assets that are a member of any of the Entity's subscribed Blocked Content Collections. By default, Child Entities are subscribed by the Service to the Service's own Blocked Content Collections, which may be categorized and applied by age appropriateness. Additionally, the Service creates a Personal Blocked Content Collection (initially empty) for each Child Entity, used by parents to specify additional content to be blocked for their child. The Child Entity is automatically subscribed with Use Content permission (note: this permission does not allow the child to see members of the Collection) and the Child Entity's parents are given View, Add, and Remove Content permissions. Parents may subscribe their children to additional Blocked Content Collections, provided by the Service or shared by other Entities.

Challenge Handler

The Challenge Handler maintains state and implements business logic for Challenges and Awards associated with Collections or Content. It maintains the integrity of Challenge object, created by Users, and Award objects which represent Challenge progress for Entities and awards earned.

Challenges

Challenges are defined by Users and are associated with Collections or Content. Challenge objects are persisted by the Database in its Challenges table and have the following core attributes:

- The Challenge's ID—the object's primary key
- The associated Collection ID or Content ID
- Challenge title
- Challenge description
- Challenge enabled/disabled flag—default is enabled
- Date/time Challenge created
- Date/time Challenge begins (no User engagement permitted before)—defaults to date/time created
- Date/time Challenge expires (no User engagement permitted after)
- The set of challenge questions—each question has the following attributes:
  - Question number (an integer uniquely identifying question within set and indicating sort order for display to Users)
  - Question text
  - Answer type—Text or Choice
  - The set of acceptable text answers, if any
  - Normalize text answer flag (normalizes typed answer for things like punctuation, whitespace, capitalization, etc.—default is true
  - The set of acceptable multiple-choice answers, if any—each has the following attributes:
    - Answer text
    - Correct answer flag
  - Number of answer attempts allowed for the question-default unlimited (represented by 0)
  - Reveal answer flag—if true, the answer is revealed to the User following the final incorrect attempt, default true
  - Points awarded for correct answer
- The set of scavenger hunt items to be found-elements of the set are (Content ID, point value) pairs
- The set of awards granted—each element of the set includes the following attributes:
  - Award number (an integer uniquely identifying award within set)
  - The requisite score to earn the award
  - The number to be awarded-default unlimited (represented by 0)
  - The number awarded so far
  - Remove award when greater earned-default true Award title and description
  - Award type-Trophy, UI Background/Color Scheme, Messaging Glyphs, Avatar Gear, Text
  - Award definition for Trophy type:
    - Trophy image identifier (network location of image file)
    - Trophy title
    - Trophy description
  - Award definition for UI Background/Color Scheme, Messaging Glyphs, and Avatar Gear types: The set of items to be awarded-elements are identifiers for objects being awarded
  - Award definition for Text type:
    - Text label
    - The set of text strings to be awarded Awards When a user Entity engages a Challenge, their progress is recorded by the Service to track attempts, points earned, and awards granted. Award objects store this data, persisted by the Database's Awards table, and have the following core attributes:

- The User's Entity ID—the object's primary/hash key
- The Challenge ID—the object's secondary/sort key
- Date/time Challenge first engaged Date/time Challenge last engaged
- Total points earned
- The set of question attempts—each element has the following attributes:
  - Question number
  - Number of attempts
  - Date/time of last attempt
  - Points earned—0 until correct answer given
- The set of scavenger hunt items found—each element has the following attributes:
  - Content ID of found item
  - Date/time found
  - Points earned—0 until item found
- The set of awards granted—each element has the following attributes:
  - Award number
  - Date/time awarded
  - Award type
  - Award title and description (cached from Challenge object)
  - Item(s) awarded (e.g., Trophy info, text string, identifiers for awarded UI items, etc., depending on award type)

Key Challenge Handler API functionality includes the following:

- Create/get/update/disable/enable challenge
  - once a Challenge becomes active (has User engagement), some elements cannot be changed (e.g., questions/answers and awards) but new elements can be added
  - if the changes needed are restricted, the Challenge is ended or disabled and a new Challenge is created
  - past Challenges are retained by the Service for reference by Award objects
- Add Challenge question
- Add Challenge scavenger hunt item Add Challenge award Get Challenge progress for Entity (awards, question answers, scavenger hunt items found, points earned, etc.)

Update Challenge progress for Entity with question attempt (with points earned, if correct)

Update Challenge progress for Entity with scavenger hunt item found and points earned Update Challenge progress for Entity with award granted Delete Challenge progress (Award object)

Messaging Handler

The Messaging Handler maintains threads of comments submitted by user Entities. These threads are used for comments about Collections or Content and also for interaction between trusted user Entities. The Messaging Handler maintains the integrity of messages and threads, implements the Service associated business rules, and performs housekeeping of threads, to save space.

With regard to design, Threads are essentially collections of messages with participants. The data model is very similar to what is used by the Collections Handler, but the business rules and operations are different. When using database management systems that do not have strict schema definitions (such as NoSQL key-value stores), the following objects can be stored in the same Database tables as the Collections Handler. That is, the Thread object can be persisted in the Collections table, the Participant Object in the Subscriptions table, and the Message object in the Content table. Otherwise, each object will have its own respective table.

The Thread object defines a thread of messages and has the following core attributes:

Thread ID—the object's primary/hash key

Owner's ID (Entity or Collection)

Created date/time

Thread enabled flag (cannot be accessed if false)—default is true

The set of permitted interaction modes-Glyphs, Text, Images, Audio, Video

The Participant object stores information about a user Entity that has permission for a Thread and has the following core attributes:

The Participant's Entity ID—the object's primary/hash key

The Thread ID of the Thread participating in—the object's secondary/sort key

Date/time added

Date/time removed—default is empty/nil, indicating Participant is active in thread Permissions—Participant (can read messages posted since Participant was added to thread and submit messages), Moderator (Participant authority and can remove comments), Co-Owner (Moderator authority and can set permissions), Blocked (not permitted to participate)

The Message object holds the content of a message in a thread that was submitted by a user Entity. It has the following core attributes:

Thread ID—the object's primary/hash key

Created date/time—the object's secondary/sort key

Expiration date/time, if any (the date after which the message is removed from the thread)

Author's Entity ID

Message enabled flag (not included in thread if false)—default is true

Message text—can include Unicode text, emojis, and application-specific glyphs

Message effects-UI effects that accompany the message

Key Messaging Handler API functionality includes the following:

Create/get/enable/disable/delete Thread

Update Thread interaction modes

Add/get/remove Participant from Thread

Update Participant permissions for Thread

Post Message from Participant to Thread

Get Messages of Thread

Get Messages of Thread posted on-or-after start date/time

Get Messages of Thread posted on-or-after start date/time AND before end date/time Enable/disable/remove Message posted to Thread at date/time Enable/disable/remove Messages from Thread posted by Entity Notification Handler The Notification Handler interacts with commercial third-party services (e.g., Amazon Simple Notification Handler) to send native device push notifications, SMS messages, and e-mail messages. Messages notify user Entities of interesting activity, such as new requests, trust relationships, or content availability and are used to interact with Users for security purposes, such as two-factor authentication. Messages are also used by the Service to control client applications, such as to signal when centrally stored state (e.g., a trusted Entity's profile image) has been updated and should be re-loaded.

The Notification Handler implements the Service business rules for notifications, coordinates and stores third-party messaging tokens (generated by third-party services), formats messages of different types depending on the content and needs of the third-party messaging service, and interacts with third-party messaging services to send messages to User endpoints (i.e., SMS and e-mail) and devices. User Entity notification state is stored in Notification objects that are persisted by the Database in the Notifications table and have the following core attributes:

User Entity ID—the object's primary/hash key

Date/time notification last sent

The set of third-party messaging service tokens, representing notification endpoints for an Entity (i.e., SMS and e-mail) and their client devices (e.g., iOS and Android), along with the date each was created in the Service Key Notification Handler API functionality includes the following:

Register third-party service endpoint for new device token

Update third-party service endpoint for device token

Unregister third-party service endpoint for device token

Create/get/update/delete Entity device tokens and endpoints from Database

Send Child Entity request notification

Send new Content notification

Send deleted Content notification

Send Entity profile updated notification

Send trust Invitation accepted notification

Send trust relationship ended notification

Send report software state notification

Send new Child Entity notification

Send new Invitation notification

Send Second Parent Invitation received notification

Send Second Parent exited relationship notification

Send Second Parent removed notification

Physical Server

The software described above is hosted using a combination of web, database, storage, notification, and other servers (network-attached server-class computers with attached and remote storage, running the Linux operating system), network load balancers (to distribute requests horizontally across multiple servers, for scale), and standard Internet services, such as the Domain Name Service, to direct requests from clients to the Service servers. While not necessary, this implementation uses a commercial cloud hosting service (such as Amazon AWS or Microsoft Azure) to host the servers, storage, and other third-party services described.

The Client Application

The client application (app) provides the user interface to the Service, enabling Users to perform basic functionality, such as the following:
- Create and manage their User Account and associated Entities (children, profiles, Second Parents, etc.)
- Manage trust relationships with other Entities and Collections
- Curate and share Approved Content
- Organize and share Approved and Blocked Content with Collections
- Create and engage Challenges, earn awards
- Discover interesting and appropriate Content to use
- Use Content safely
- Interact with Content (e.g., ratings and comments) and other Entities (e.g., messages)
- Manage children's Approved and Blocked Content
- Moderate child activity Using Content Safely One function of the client app is to implement the safeguards that prevent content that hasn't been approved from being used. This is accomplished with the embodiment's software and by utilizing native features of the client app's host platform (i.e., the device's operating system, hardware, etc.).

For most content types, the Service process for authorizing use is simple:
1. When the client app launches and the user Entity signs-in, the client app downloads from the server the Content objects from the Entity's subscribed Collections, giving the client app a local cache of Approved and Blocked Content.
2. When the User wishes to engage/use Approved Content, they use the client app to browse lists of Approved Content amongst their Collections.
3. To use a content asset, such as an app, video, image, or music, they simply select it from the list.
4. The client app accesses the server to confirm that the selected content is still Approved and hasn't been Blocked since the client's cache was last updated.
   a. If the content is no longer approved or if it is now blocked, the client app's cache is updated and the User is notified of the change.
5. Since the selected content has been confirmed approved and not blocked, the client app launches the content and delivers its User experience.
6. When done using the selected content, the client app returns the User to continue browsing their Approved Content Collections, since additional content is not offered (i.e., referenced or linked) from within the User experience for these content types.

The case for content types listed in step 3 (above) is simple because the User selects only from lists of content believed by the client app to be Approved and not Blocked. However, in the case of web page content, the User experience and authorization process are more complicated because web pages have links to more web pages and other content types, which could be Approved, not yet Approved, or Blocked.

To enable Users to engage approved web pages safely, the client app has web browser capabilities built-in as part of its functionality. This enables it to perform content authorization when links within an Approved web page are selected by the User, loading the new content only when the server confirms the content is Approved and not Blocked. When links to Blocked Content are selected, the User is notified the content is not permitted. In cases when the selected content is not Blocked and not yet Approved, the User is offered an opportunity to request approval from their parents.

Client Application Design

There are 2 classes of client application: the web app and native application. The web app is developed with standard HTML, JavaScript, and Java Servlet/JSP technologies and is accessed by the User via their modern web browser (e.g., Google's Chrome, Apple's Safari, and Microsoft's Edge). Its code is Java based, follows the Model-View-Controller design pattern, and is hosted in the same environment—using the same third-party application platform components—as the web service API and other services (though it may be hosted separately), described in the Server section above.

Native applications provide a user interface for mobile devices (e.g., running iOS and Android) and portable or desktop computers (e.g., running Windows and MacOS). They perform the same functions as the web app, using abilities native to their platform to provide a richer User experience and an execution environment for content native to their platform (such as apps). Code for native applications also follows the Model-View-Controller design pattern and is written in a language appropriate to the platform. For example, Swift is used for iOS and MacOS and Java is used for Android environments.

In preferred embodiments, client applications may interact with the Server via network communications (e.g., over the Internet) with its web service API. Storing application state and implementing business rules centrally (on the server) ensures Users may access the Service from multiple locations, using multiple devices (and device types), and functionality will remain secure, consistent, and without data loss.

Figure 13:
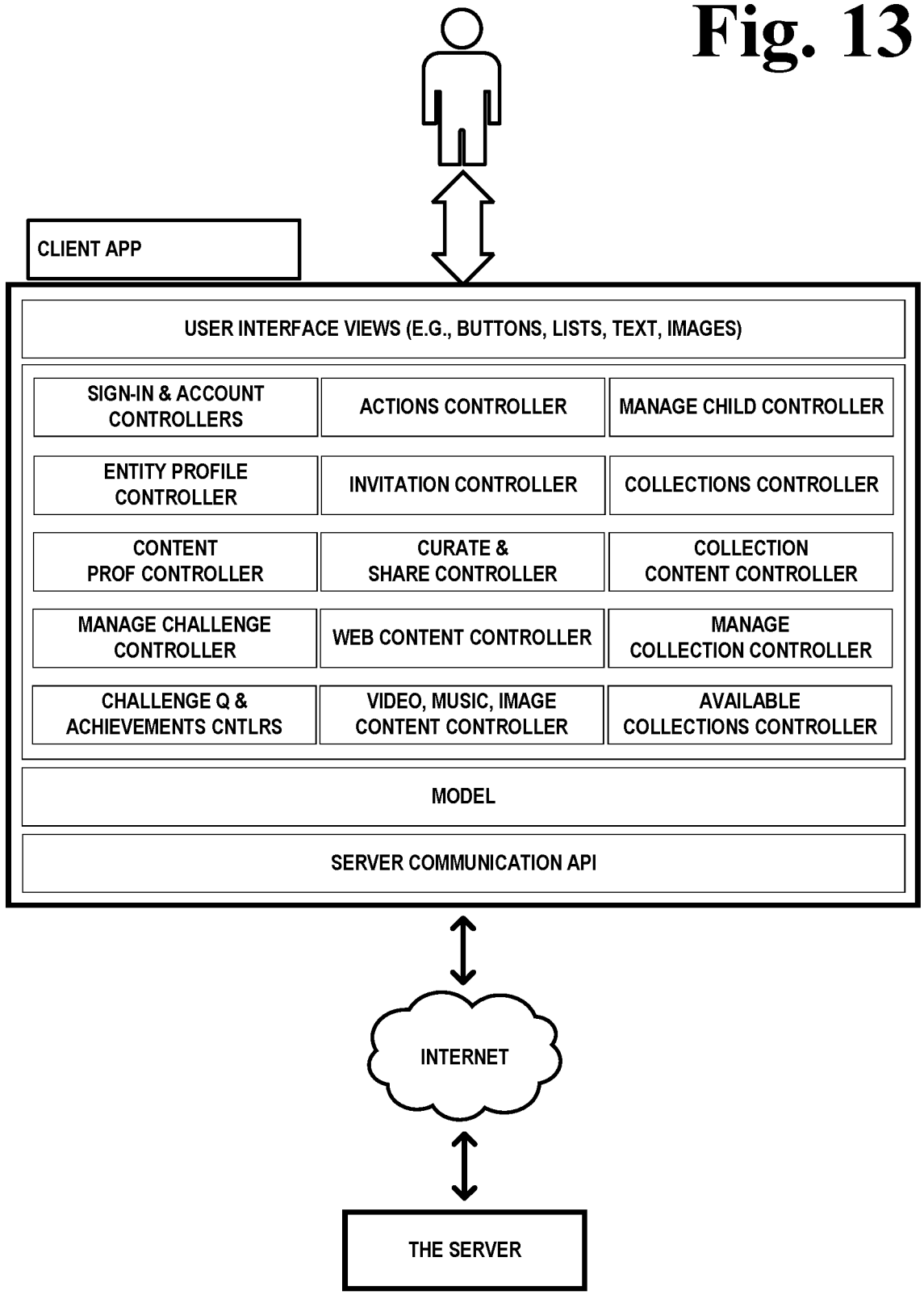
FIG. 13 is a logical diagram of an embodiment of a client application architecture.

Turning to FIG. 13, a client app architecture is illustrated.

While there are slight differences between client app implementations, due to differences in the developer APIs provided by their native host platform, each client app shares the same general design: a single Server API component, a single Model component, multiple controllers (implementing logic that controls the user interface by presenting views/controls and interacting with the Model to retrieve and submit data and action requests), and many user interface views and controls (e.g., buttons, text boxes, input boxes, table views, scroll views, image views, etc.). Native client apps have the following major architectural components, as depicted in FIG. 13.

Server Communication API

Client apps interact with the Server via its web service API. The client's Server Communications API handles authentication of Users with the Server, manages User sessions with the Server, encodes and sends client requests to the Server, and decodes Server responses passing results, including potential errors, to the client's Model. As a matter of design, client communication with the server is performed by this component and the Model is the only client component to interact with this component.

The Model

While the Server is the authority of application state/data, the model caches data used by the client app for better User experience performance. This includes data such as, User Account information, user Entity profiles, parent/child and trust relationships, content Collections, Challenge data (progress and awards), Threads, etc. Synchronously with User interaction, the client's controller components interact with the Model to get and supply (e.g., inputs from Users) information and requests/actions needed to provide the correct User experience and initiate necessary Server interaction. Because the Model handles interaction with the Server, via the Server Communication API, controllers need only know about the Model's controller API. The Server also notifies clients of state changes asynchronously, vie push notifications. The Model processes these notifications, updates its cache, and signals controllers of relevant state changes so they may update the User experience, as appropriate.

Sign-In Controller

When there is no active session, this controller presents the user interface that enables the User to enter their username and password. The controller provides this to the Model, which interacts with Server (via the API) to authenticate the User. The Model then provides this controller the Entities associated with the User Account and the controller directs the User to select which account Entity will be the session's active User. Finally, the controller notifies the Model of the selected Active Entity. In the case when there is no active session, this is the only active controller (i.e., Users of the client app may do only this).

Account Controller

This controller enables User to view and manage elements of the associated User Account, Entity profiles, Entity relationships (such as trust and Second Parents), and Entity Awards. It retrieves from the Model data relevant to the Active Entity. If the session's Active Entity is an adult (the User Accounts self-Entity), then the controller presents the ability for the User to manage (i.e., invite, view, and remove) Second Parents; add and remove Child Entities; view and edit their Entity profile (when selected, this controller launches to Entity Profile Controller); manage (i.e., invite, view, and remove) their trust relationships. If the adult User selects a Child Entity from the list presented, this controller launches the Manage Child Controller, which offers more functionality regarding the selected Child Entity.

If the Active Entity is a child, this controller enables them to view their parent relationships, view their trust relationships, send trust relationship invitation requests to their parents, edit their Entity profile in a limited way, view Challenge progress and earned awards, etc.

Manage Child Controller

When an adult User selects a Child Entity from the list presented by the Account Controller, this controller is launched and provides the ability for the User to manage the child, including their trust relationships (i.e., invite, view, and remove), profile settings (when selected, this controller launches to Entity Profile Controller), Homework Mode configuration, Blocked Content, etc.

Entity Profile Controller

This controller is launched anytime an Entity is selected in the user interface with the purpose of viewing or editing its profile. The controller retrieves the Entity's profile information from the Model, including the Entity's relationship to the Active Entity, and limits profile edits to a User's own profile, with restrictions if the Active Entity is a child, or an adult User's children's profiles. When a profile is updated, the controller validates the inputs and submits the updates to the Model, which updates the Server, via the Server Communication API.

Entity Invitation Controller

This controller enables the User to search for and select the desired User Entity and then send an invitation to the Entity for a specified relationship. The type of relationship is either trust, Second Parent, or Collection subscription depending on context provided by its parent controller (the controller that launched it). This controller passes the search terms, entered by the User, to the Model which searches its cache and queries the Server to find matching Entities. When the Model returns the matches, this controller presents the User with a list to browse, viewing profiles (which causes this controller to launch the Entity Profile Controller) as desired. Once the User selects the desired Entity and selects the Invite button, this controller submits an invitation request (of the specified type) to the Model, which subsequently issues the request to the Server. This controller notifies the User when the process is complete and reports any error.

Actions Controller

The Actions Controller retrieves the User's pending actions and alerts from the Model and presents them to the User in organized lists, along with embedded controls for quick response (e.g., accept, reject, view details). If the User selects view, this controller launches the controller appropriate for displaying and interacting with the request/alert's details (e.g., the Content Profile Controller). When the User selects accept or reject, the controller sends the instruction to the Model, which carries out the process with the Server and updates its cache.

Content Profile Controller

This controller retrieves the profile of selected content from the Model and presents it to the User for viewing. As profile content and layout varies by content type, this controller adapts the views presented to match the type of the selected content.

Curate and Share Content Controller

This controller takes as input a content asset and, depending on its type, presents the User with the appropriate curation worksheet, making it quick and easy for them to curate the content. At any time, they may select the targets of their sharing from the presented list of shareable entities (the set of context-appropriate and authorized entities, such as user Entities and Collections, retrieved from the Model). When complete, the controller validates the inputs and sends the information to the Model for processing.

Collections Controller

This controller is responsible for the interface enabling a User to browse their approved Collections, search for Approved Content within their Collections, select a Collection for browsing/searching, remove a Collection, and search for available Collections to add. Collection and content data is retrieved from the Model and assembled into table views, for browsing. A search box is presented to enable algorithmic searches of content and Collections. When an Approved Content asset is selected, the appropriate content viewing controller (see below) is launched. When an approved Collection is selected, the Collection Content Controller is launched. When a Collection is selected for removal, the request is sent to the Model and the User is notified of the result. When the User selects the menu item to search for available Collections (not yet approved), the Available Collection Controller is launched. Finally, this controller allows parents to view and manage the Collections of their children, as they would their own, by selecting the child from the list presented by the View menu item.

Collection Content Controller

The experience provided by this controller enables the User to browse, search, use, and remove content from the selected Collection (which could be a child's Collection being viewed by a parent). The User may select content of interest from the list presented (which can be sorted by various attributes, such as popularity, ratings, date added, etc.) to view its profile (this controller launches the Content Profile Controller) or use (this controller launches the appropriate content viewing controller). Content may be moved to a different Collection, removed from the Collection, or shared with other Entities using UI controls presented by this controller. The controller interacts with the Model to carry out such actions.

Manage Collection Controller

This controller provides the interface for a User to create a new Collection, including its profile (attributes from the Collection Object, described earlier) and associated Challenges, and share it with others—or manage the profile and permissions of an existing Collection.

When launched in create mode, the controller presents a form for the User to provide values for the attributes of the Collection's profile (described by the Collection Object, earlier), including whether the Collection is for Approved or Blocked content. The controller collects and validates these inputs. When the User selects the button to add a Challenge to the Collection, this controller launches the Manage Challenge Controller, in create mode. When done configuring the Collection, the controller sends the Collection creation request to the Model for processing and reports the result to the User. If successful, the User is permitted to share the Collection with other Entities. When the User selects the button to share the Collection, the controller presents a list of entities with which the User may share (retrieved from the Model) and enables the User to configure (permissions) and send invitations to those selected. The invitations are forwarded by the controller to the Model for processing.

This controller can also be launched in manage mode, which presents an experience to the User enabling them to view/edit the profile and view/edit/add/remove permissions and subscriptions.

Manage Challenge Controller

Challenges are created and managed with the experiences presented by this controller. When launched in create mode, the User is presented a form used to configure the Challenge (attributes are described by the Challenge Object, earlier). Also presented are user interface elements to add scavenger hunt items and questionnaires. When complete, the controller validates the inputs and forwards the Challenge create request to the Model for processing.

When launched in modify mode, the controller retrieves the existing Challenge from the Model and populates the fields of the interface with existing attribute values and status. The controller implements logic to limit the types of changes allowed for an active Challenge. When edits are complete and the User selects the submit button, the controller sends the updates to the Model for processing and reports the resulting status to the User.

Available Collections Controller

This controller is responsible for the experience that enables Users to explore Collections available to them (not yet approved) and add/subscribe to them (if the Active Entity is an adult) or request approval from their parents. It presents a search box, for algorithmic search, and a browsable hierarchy of Collections, retrieved from the Model, arranged by topic. When a Collection is selected, this controller launches the Collection Profile Controller, to present more information about the Collection. If the User selects the Add button, then the controller directs the Model to either add the Collections for the selected Entity (in the case of an adult Active Entity, either themselves or their child) or send a request to the User's parents.

Web Content Controller

Used to enable use/viewing of web page content, this controller is the most sophisticated of the content-use controllers. Provided an initial web page URL to view, the controller interacts with the Model to confirm the web page is approved. If it is, the controller uses web browser functionality to load and display the web page. If not, it presents the User an option to easily request approval from their parents. If the User selects content or a link within the displayed web page, the controller again confirms with the Model that the requested content is approved and repeats the process. For approved content being viewing, the controller presents the User options to share the content with others (or a Collection), add the content to their Favorites Collection, and rate/comment on the content.

If linked content of type video, music, or image is embedded in a web page, this controller is responsible for presenting its use. If the referenced content is stand-alone, then this controller launches the Video, Music, and Image Content Controller for presentation.

This controller is also responsible for presenting associated content effects (on open, during, and after using), if any; acknowledging Challenge scavenger hunt finds; launching the Challenge Questionnaire Controller (for content having associated Challenge questions); and launching the Challenge Achievement Controller, when presenting Challenge achievements.

Video, Music, and Image Content Controller

This controller plays the same role as the web Content Controller, but for content types including video, music, and images.

App Content Controller

When the content type of an asset being launched is App, this controller interacts with the client app's host platform (operating system) to initiate the launch of the App for use. Because use of app content happens outside of the Service client app, enforcement of the Service access controls for this content type is provided by the client app's host operating system.

Challenge Questionnaire Controller

The question and answer experience for a Challenge is presented by this controller. When launched by another controller, this controller is provided the IDs of Challenges to be presented to the User. Those Challenge objects are retrieved from the Model and this controller presents the user interface for answering the questions. Effects associated with correct and incorrect answers are presented and Challenge rules (e.g., the number of retries allowed) are enforced by the controller's logic. As progress is made in answering questions, Challenge activity is updated via calls to the Model.

Challenge Achievement Controller

This controller is launched when the User reaches an achievement in one of their Challenges. It presents any awards granted, along with accompanying user interface effects; an explanation of progress; remaining goals; etc.

Other Applications

Embodiments may be applicable anywhere a group of people having varying levels or authority or access to resources or assets would benefit from an infrastructure that formalizes authority relationships and enforces associated rules for granting/preventing permissions and protecting use of the resources/assets. While, above, embodiments are applied to parents, children, and other adults for expanding and regulating access to digital content by children, it may also be applied to small and large organizations, including nonprofits, schools, churches, the government, and the workplace. In such an example, protected resources and assets could include access to shared conference rooms, IT assets (e.g., compute, storage, and printers), facilities, machinery, and varying permissions to IT software/systems, shared files, data warehouses. Embodiments can be applied to any asset/resource so long as it can be uniquely identified.

In general terms, embodiments enable a group of people to easily self-organize into a hierarchy of authority for granting and denying specified members of the group permission to use protected resources and assets. Members of a group are assigned one the following roles:

Managers—responsible for the well-being of their Subordinates, via individual granting and denying permissions and authorizing Supporters (Managers may designate co-Managers)

Supporters—when authorized by a Manager, may grant permissions to that Manager's Subordinates in support of their well-being (may be a peer to the Subordinate)

Subordinates—the recipients of granted and denied permissions for access to resources and assets that contribute to their well-being A group is formed when it is initiated by someone authorized by the Service to be a Manager. That person is assigned by the Service/Service the role of Manager for the new group and has complete control over the group's membership, assigned roles, and relationships between members. They form the group by assigning roles to other individuals, beginning with their group's Subordinates. For each individual Subordinate, the Manager may assign other individuals the role of either co-Manager or Supporter. As such, each Subordinate may have the same or different sets of co-Managers and Supporters, but they typically share the same Manager. Note that a Subordinate in a group may be assigned the role of Supporter or co-Manager for a different Subordinate in the same group. The Manager may end these relationships at any time by removing Subordinates, or any of their designated co-Managers or Supporters, from the group.

Subordinates benefit by having Managers and Supporters who have permission to share resources or assets that are valuable to the Subordinate and for which the Subordinate doesn't otherwise have permission. The Subordinate's well-being is advanced when Managers and Supporters grant such permissions to the Subordinate and when Managers take care to deny permission to resources or assets that are not in the Subordinate's best interest.

While the above group exhibits a 3-level authority hierarchy, a Manager of a group (the root group) may grant any of its Subordinates authority to create and Manage a subgroup (a child group), extending the root group by adding more levels of hierarchy. The Manager of the root group has the same authority for its descendent groups and there's typically no limit to the depth of a group's hierarchy or the number of descendent groups. With this, complex organizations, such as those of corporate enterprises, can be easily created/modeled and managed.

In the earlier examples, Managers are parents, subordinates are their children, and supporters are other trusted adults, trusted children (peers), and trusted Collections of permissions curated by others. Children benefit by being granted permission to use appropriate digital content, which increases their enjoyment by expanding their selection of valuable content, and by being blocked from accessing inappropriate content, sparing them bad experiences.

Of course, certain steps or the entirety of the steps from any of the above flow charts can be repeated in part or in whole, single or multiple times, without departing from the spirit of advancements described herein.

Computer Implementation

Figure 14:
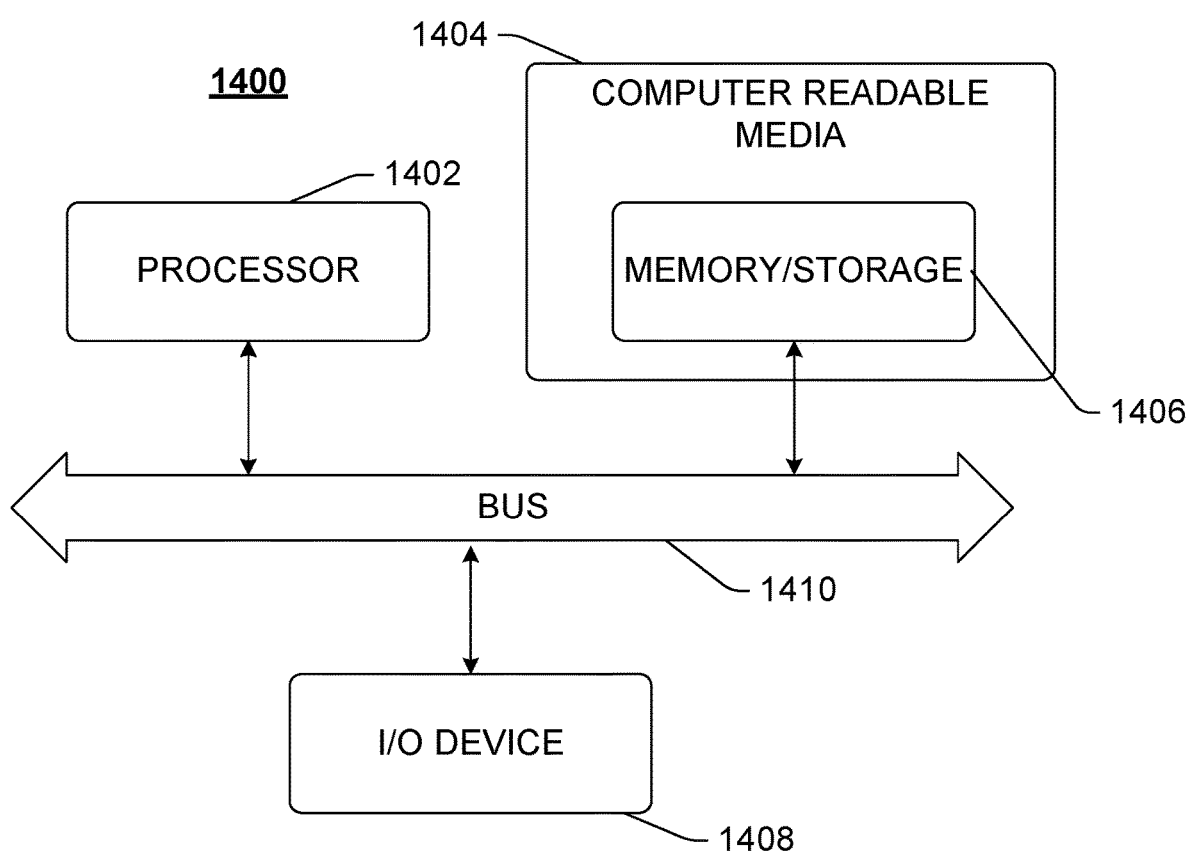
FIG. 14 is a logical diagram of an embodiment of an example computing device.

FIG. 14 illustrates an example computing device 1400 that can be configured to implement embodiments in accordance with one or more embodiments. Computing device 1400 can implement any of the techniques and processes discussed herein.

Computing device 1400 includes one or more processors or processing units 1402, one or more computer readable media 1404 which can include one or more memory and/or storage components 1406, one or more input/output (I/O) devices 1408, and a bus 1410 that allows the various components and devices to communicate with one another. Computer readable media 1404 and/or I/O device(s) 1408 can be included as part of, or alternatively may be coupled to, computing device 1400. Bus 1410 represents one or more of any of several types of bus structures, including a memory bus or memory controller, a peripheral bus, an accelerated graphics port, and a processor or local bus using any of a variety of bus architectures. Bus 1410 can include wired and/or wireless buses.

Memory/storage component 1406 represents one or more computer storage media. Component 1406 can include volatile media (such as random access memory (RAM)) and/or nonvolatile media (such as read only memory (ROM), Flash memory, optical disks, magnetic disks, and so forth). Component 1406 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by processor 1402. It is to be appreciated that different instructions can be stored in different components of computing device 1400, such as in processor 1402, in various cache memories of processor 1402, in other cache memories of device 1400 (not shown), on other computer readable media, and so forth. Additionally, it is to be appreciated that the location where instructions are stored in computing device 1400 can change over time.

One or more input/output devices 1408 allow a User to enter commands and information to computing device 1400, and also allows information to be presented to the User and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. "Computer readable media" can be any available medium or media that can be accessed by a computing device. By way of example, and not limitation, computer readable media may comprise "computer storage media" and "communications media."

"Computer storage media" include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Additionally, it should be noted that in one or more embodiments the techniques discussed herein can be implemented in hardware. For example, one or more logic circuits, application-specific integrated circuits (ASICs), programmable logic devices (PLDs), and so forth can be created and/or configured to implement the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Additional Enablement

To further enable one skilled in the arts to practice embodiments, the additional text below is provided in accordance with the claims.

In one aspect, disclosed is a method for controlling access to content, comprising: registering a first user, the first user having authority to control content available to a second user, registering the second user, trusting an entity by the first user thereby creating a trust relationship, wherein the trust relationship authorizes the entity to allow the second user access to content, and, providing access to content to the second user via the trust relationship. In embodiments, the first user may be a parent and the second user may be a child. The first user may be an organization and the second user may be an employee. The entity may be a third user. The second user may be a child and the third user may be a second child, and wherein the access to content provided to the second user via the trust relationship may be provided only if the content has an age appropriate rating less than or equal to the second user's age. The second user may be a child and the third user may be an organization, and wherein the access to content provided to the second user via the trust relationship may be provided only if the content has an age appropriate rating less than or equal to the second user's age. The second user may be a child and the third user may be an adult, and wherein the access to content via the trust relationship may be provided to the second user without regard to the second user's age. The step of trusting the third user may occur via a curation reputation of the third user. The method may further comprise: curating a collection, the collection comprising one or more content identifiers to access content, and, wherein the step of providing access to content to the second user via the trust relationship occurs via the collection. The content identifier may be an Internet address to retrieve approved content. The one or more content identifiers may comprise an Internet address representing blocked content. The collection may be curated by the third user. The entity may be a collection. The collection may be curated by a non-trusted user or non-trusted organization. The entity may be a community, and access to content for the second user may be authorized based on content reputation aggregated from the community. The second user may be provided access to content if an age appropriateness rating of the content may be equal to or less than the second user's age. The method may further comprise: curating a collection, the collection comprising one or more content identifiers to access content, wherein the collection may be curated by the third user, wherein the one or more content identifiers comprises approved content, wherein the step of providing content to the second user via the trust relationship occurs via the collection, wherein the first user may be a parent, the second user may be a child and the third user may be a child, wherein the content provided to the second user may be provided only if the content has an age appropriate rating less than or equal to the second user's age, and wherein the collection further comprises a taxonomy categorization of the content.

In another aspect, disclosed is a method for curating a collection of content, comprising: receiving one or more content identifiers to access the content from a first user, automatically retrieving the content at the one or more content identifiers, automatically determining a content reputation based on the retrieved content and aggregated data, presenting the content reputation to the first user, receiving an age appropriateness rating of the content from the first user, and receiving a categorization of the content from the first user. In embodiments, the step of determining the content reputation may comprise automatically analyzing the retrieved content and aggregated data to determine a suggested age appropriateness rating to be included in the content reputation. The step of determining the content reputation may comprise automatically analyzing the retrieved content and aggregated data to determine topics of interest and geographic relevance to be included in the content reputation. The method may further comprise: providing a second user, wherein the second user may be an intended viewer of the content, and wherein the step of determining the content reputation comprises automatically analyzing aggregated data to determine current popularity with groups of users similar to the second user. The method may further comprise: providing a second user, wherein the second user may be an intended viewer of the content, and wherein the step of determining the content reputation may further comprise: automatically analyzing the retrieved content in conjunction with aggregated data to determine current popularity with groups of users similar to the second user, automatically analyzing the retrieved content to determine a suggested age appropriateness rating to be included in the content reputation, automatically analyzing the retrieved content to determine topics of interest and geographic relevance to be included in the content reputation, and wherein the step of receiving a categorization of the content may be a categorization from a taxonomy. The collection may further comprise a dynamic taxonomy categorization of the content.

In another aspect, disclosed is a system for curating collections and controlling access to content, comprising: (i) a server for: storing and administrating user accounts, trust relationships and collections of content, determining curator reputations, content reputations and content discovery, and (ii) a client application executing upon a user device for: communicating with the server to administrate a user account, trust relationship, collection of content and curate a collection, and providing an interface to curate a collection, trust another user and receive content. In embodiments, the client application may comprise one in a set consisting of: personal computer web browser, smart phone web browser, tablet web browser, mobile device web browser, television web browser and personal assistant web browser.

In another aspect, disclosed is a method for controlling access to content, comprising: registering a first user, the first user having authority to control the access to content available to a second user, registering the second user, registering a third user, trusting the third user by the first user thereby creating a trust relationship, wherein the trust relationship allows the third user to provide access to the content to the second user.

In another aspect, disclosed is a method for controlling access to content, comprising: registering a first user, the first user having authority to control the access to content available to a second user, registering the second user, curating a collection, the collection comprising one or more content identifiers to access the content; and, controlling access to the content for the second user based on the collection.

In another aspect, disclosed is a method for curating a collection of content, comprising: receiving one or more content identifiers to access the content from a first user, retrieving the content at the one or more content identifiers, receiving an age appropriateness rating of the content from the first user, and receiving a categorization of the content from the first user.

CONCLUSION

Unless otherwise indicated, all numbers expressing quantities used in the specification and claims are to be understood as being modified in all instances by the term "about" or "approximately." Accordingly, unless indicated to the contrary, the numerical parameters set forth in the following specification and attached claims are approximations that may vary depending upon the desired properties sought to be obtained by embodiments. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of embodiments are approximations, the numerical values set forth in the specific examples are reported as precisely as possible. If specific results of any tests are reported in the technical disclosure, any numerical value inherently can contain certain errors necessarily resulting from the standard deviation found in the respective testing measurements.

The terms "a" and "an" and "the" and similar referents used in the context of describing embodiments (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as", "in the case", "by way of example") provided herein is intended merely to better illuminate embodiments and does not pose a limitation on the scope of the embodiments otherwise claimed. No language in the specification should be construed as indicating any non-claimed element essential to the practice of embodiments.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability.

Preferred embodiments are described herein, including the best mode known to the inventors for carrying out embodiments. Of course, variations on those preferred embodiments will become apparent to those of ordinary skill in the art upon reading the foregoing description. The inventor(s) expects skilled artisans to employ such variations as appropriate, and the inventor(s) intend for embodiments to be practiced otherwise than specifically described herein. Accordingly, embodiments include all modifications and equivalents of the subject matter recited in the claims appended hereto as permitted by applicable law. Moreover, any combination of the above-described elements in all possible variations thereof is encompassed by embodiments unless otherwise indicated herein or otherwise clearly contradicted by context.

Furthermore, if any references have been made to patents and printed publications in this specification, then each of the above cited references and printed publications, if any, are herein individually incorporated by reference in their entirety.

In closing, it is to be understood that the embodiments disclosed herein are illustrative of the principles of embodiments. Other modifications that may be employed are within the scope of embodiments. Thus, by way of example, but not of limitation, alternative configurations of the present embodiments may be utilized in accordance with the teachings herein. Accordingly, embodiments are not limited to that precisely as shown and described.

What is claimed is:

1. A computer-implemented method comprising:
    obtain, from a first user, a set of content restrictions that are based at least in part on content ratings of individual pieces of content;
    obtain, at a direction of the first user, a collection of content from one or more authorized entities including the content ratings corresponding to the set of content restrictions;
    determine whether at least a portion of the collection of content is to be made available to a second user based on the content ratings and the set of content restrictions; and
    provide the portion of the content to the second user, wherein:
        the content ratings include an age-appropriateness rating; and the set of content restrictions specifies a minimum age of the second user.

2. The computer-implemented method of claim 1, wherein an individual content rating for an individual piece of content is based at least in part on an aggregate content rating generated from at least a plurality of content ratings submitted by a plurality of users.

3. The computer-implemented method of claim 1, wherein the content is a web page, media, video, audio, music, or computer file.

4. The computer-implemented method of claim 1, wherein the collection of content is received from a file server.

5. The computer-implemented method of claim 4, wherein the portion of the content is provided to the second user by the file server.

6. A computer system comprising:
one or more processors; and
memory storing computer-executable instructions that, as a result of being executed by the one or more processors, cause the computer system to:
obtain, from a first user, a set of content restrictions that are based at least in part on content ratings of individual pieces of content;
obtain, at a direction of the first user, a collection of content from one or more authorized entities including the content ratings corresponding to the set of content restrictions;
determine whether at least a portion of the collection of content is to be made accessible to a second user by at least applying the content ratings to the set of content restrictions specified by the first user; and
cause the portion of content to be accessible to the second user, wherein:
the content ratings include an age-appropriateness rating; and
the set of content restrictions specifies a minimum age of the second user.

7. The computer system of claim 6, wherein an individual content rating for an individual piece of content is based at least in part on an aggregate content rating generated from at least a plurality of content ratings submitted by a plurality of users.

8. The computer system of claim 6, wherein the collection of content includes video content, image content, sound content, or a text document.

9. The computer system of claim 6, wherein the second user is prevented from modifying the set of content restrictions and the content ratings.

10. The computer system of claim 6, wherein the computer-executable instructions, as a result of being executed by the one or more processors, cause the computer system to further:
store one or more content identifiers that identify the collection of content; and
provide access to the collection of content via the one or more content identifiers.

11. The computer system of claim 6, wherein the computer-executable instructions, as a result of being executed by the one or more processors, cause the computer system to further determine a curation reputation of the entity based at least in part on information provided by a plurality of users.

12. The computer system of claim 11, wherein content provided by the entity has a content rating that is based at least in part on the curation reputation of the entity.

13. Non-transitory computer readable media storing computer-executable instructions that, as a result of being executed by one or more processors of a computer system, cause the computer system to:
obtain, from a first user, a set of content restrictions that are based at least in part on content ratings of individual pieces of content;
obtain, at a direction of the first user, a collection of rated content from one or more authorized entities including the content ratings corresponding to the set of content restrictions;
determine whether at least a portion of the collection of rated content is to be made available to a second user based on the content ratings and the set of content restrictions; and
provide a portion of the rated content to the second user based at least in part on the content restrictions controlled by the first user, wherein:
the content ratings include an age-appropriateness rating; and
the set of content restrictions specifies a minimum age of the second user.

14. The non-transitory computer readable media of claim 13, wherein:
the content ratings are based at least in part on an aggregate content rating generated from at least a plurality of content ratings submitted by a plurality of users.

15. The non-transitory computer readable media of claim 13, wherein the rated content is an IT asset or resource.

16. The non-transitory computer readable media of claim 13, wherein:
the computer-executable instructions, as a result of being executed by one or more processors of the computer system, cause the computer system to determine topics of interest and geographic relevance for a piece of the rated content; and
the content rating is based at least in part on the topics of interest and the geographic relevance.

17. The non-transitory computer readable media of claim 13, wherein the computer-executable instructions, as a result of being executed by one or more processors of the computer system, cause the computer system to:
determine a popularity measure of the rated content with groups of users that control access to content for users of an age similar to that of the first user; and
suggest content to the second user based at least in part on the popularity measure.

18. The non-transitory computer readable media of claim 13, wherein:
individual pieces of content of the rated content have one or more associated content ratings; and
access to the rated content is provided in accordance with the content restrictions.

19. The computer-implemented method of claim 1, further comprising:
preventing the second user from modifying the set of content restrictions and the content ratings.

20. The non-transitory computer readable media of claim 13, wherein the second user is prevented from modifying the set of content restrictions and the content ratings.

* * * * *